(12) United States Patent
Zhang et al.

(10) Patent No.: US 11,683,517 B2
(45) Date of Patent: Jun. 20, 2023

(54) BLOCK-ADAPTIVE SEARCH RANGE AND COST FACTORS FOR DECODER-SIDE MOTION VECTOR (MV) DERIVATION TECHNIQUES

(71) Applicant: QUALCOMM Incorporated, San Diego, CA (US)

(72) Inventors: Zhi Zhang, Munich (DE); Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/101,687

(22) Filed: Nov. 23, 2020

(65) Prior Publication Data

US 2022/0167001 A1     May 26, 2022

(51) Int. Cl.
*H04N 19/56* (2014.01)
*H04N 19/70* (2014.01)
*H04N 19/176* (2014.01)
*H04N 19/513* (2014.01)

(52) U.S. Cl.
CPC ......... *H04N 19/513* (2014.11); *H04N 19/176* (2014.11); *H04N 19/56* (2014.11); *H04N 19/70* (2014.11)

(58) Field of Classification Search
CPC ...... H04N 19/513; H04N 19/56; H04N 19/70; H04N 19/176
See application file for complete search history.

(56) References Cited

U.S. PATENT DOCUMENTS

| | | | |
|---|---|---|---|
| 2019/0238883 A1* | 8/2019 | Chen | H04N 19/44 |
| 2020/0296416 A1 | 9/2020 | Liao et al. | |
| 2020/0374562 A1* | 11/2020 | Piao | H04N 19/117 |

OTHER PUBLICATIONS

Bross B., et al., "Versatile Video Coding (Draft 10)", JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 Pages.

Chen J., et al., "Algorithm Description for Versatile Video Coding and Test Model 10 (VTM 10)", JVET-S2002-v1, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-99.

(Continued)

*Primary Examiner* — Anner N Holder
(74) *Attorney, Agent, or Firm* — Shumaker & Sieffert, P.A.

(57) ABSTRACT

A method of decoding video data may comprise decoding data from an encoded bitstream to generate motion vectors and performing a decoder-side motion vector refinement (DMVR) process on one or more of the motion vectors. Performing the DMVR process may include determining one or more characteristics of current video block being decoded and determining a search area for the DMVR process for the current video block based on the determined one or more characteristics of the current video block.

24 Claims, 16 Drawing Sheets

(56) References Cited

OTHER PUBLICATIONS

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Wang Y-K. et al., "High Efficiency Video Coding (HEVC) Defect Report", Joint Collaborative Team on Video Coding (JCT-VC) of ITU-T SG 16WP3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Chang Y-J., et al., "Compression Efficiency Methods Beyond VVC", 21. JVET Meeting, Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, 2021, (The Joint Video Exploration Team of ISO/IEC JTC1/SC29/WG11 and ITU-T SG.16), No. JVET-U0100, Dec. 31, 2020 (Dec. 31, 2020), XP030293237, Jan. 11, 2021-Jan. 15, 2021, Online, (Motion Picture Expert Group or ISO/IEC JTC1/SC29/WG11), No. m55890, XP030290689, pp. 1-13.

Esenlik S, et al., "Description of Core Experiment 9 (CE9): Decoder Side Motion Vector Derivation", 10. JVET Meeting, Apr. 10, 2018-Apr. 20, 2018, San Diego, (The Joint Video Exploration Team of ISO/IEC JTC1/SC29/WG11 and ITU-T SG.16), URL: http://phenix.int-evry.fr/jvet/, No. JVET-J1029-v5, May 14, 2018 (May 14, 2018), XP030151329, 34 Pages.

International Search Report and Written Opinion—PCT/US2021/072494—ISA/EPO—dated Mar. 18, 2022, 15 pp.

Zhou M., et al., (BROADCOM): "Non-CE9: A Computational Complexity Analysis for DMVR", 11 th JVET Meeting, Jul. 11, 2018-Jul. 18, 2018, Ljubljana, (The Joint Video Exploration Team of ISO/IEC JTC1/SC29/WG11 and ITU-T SG.16), No. JVET-K0480, Jul. 11, 2018, XP030199484, 4 pages, Retrieved from the Internet: URL: http://phenix.int-evry.fr/jvet/doc_end_user/documents/11_Ljubljana/wg11/JVET-K0480-v1.zip JVET-K0480_v1.docx [Retrieved on Jul. 11, 2018].

\* cited by examiner

BLOCK-ADAPTIVE SEARCH RANGE AND COST FACTORS FOR DECODER-SIDE MOTION VECTOR (MV) DERIVATION TECHNIQUES

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques that can improve decoder-side motion vector refinement (DMVR) processes performed by video decoder. In some examples, the search area associated with a DMVR process is defined in an adaptive way such that different sizes or shapes of the search area may be used in different situations (e.g., for different video blocks being coded). For example, the search area associated with a DMVR process may be determined based on one or more characteristics associated with a video block being coded, such based on block size, block dimensions, resolution, or other factors. Also, this disclosure contemplates signaling techniques whereby the size (e.g., one or more dimensions) of the DMVR search area can be defined based on data that is encoded in a bitstream. The signaling may be used to define the DMVR search area in combination with determinations of block characteristics or as an alternative to determinations of block characteristics. In any case, the search area associated with a DMVR process may be adaptive, which can provide flexibility in the video decoding process and may improve video quality.

In one example, a method of decoding video data, the method may comprise decoding data from an encoded bitstream to generate motion vectors and performing a DMVR process on one or more of the motion vectors. Performing the DMVR process may include determining one or more characteristics of current video block being decoded and determining a search area for the DMVR process for the current video block based on the determined one or more characteristics of the current video block.

In another example, a device may be configured to decode video data, the device comprising one or more processors configured to decode data from an encoded bitstream to generate motion vectors and perform a DMVR process on one or more of the motion vectors. In performing the DMVR process, the one or more processors may be configured to determine one or more characteristics of current video block being decoded and determine a search area for the DMVR process for the current video block based on the determined one or more characteristics of the current video block.

In another example, a device for decoding video data may comprise means for decoding data from an encoded bitstream to generate motion vectors and means for performing a DMVR process on one or more of the motion vectors. Means for performing the DMVR process may include means for determining one or more characteristics of current video block being decoded and means for determining a search area for the DMVR process for the current video block based on the determined one or more characteristics of the current video block.

In another example, a computer-readable storage medium may store instructions that, when executed, cause one or more processors of a video decoding device to decode data from an encoded bitstream to generate motion vectors, and perform a DMVR process on one or more of the motion vectors. In performing the DMVR process, the instructions may cause the one or more processors to determine one or more characteristics of current video block being decoded, and determine a search area for the DMVR process for the current video block based on the determined one or more characteristics of the current video block.

Several other features, methods, and examples are described herein. The details of one or more examples are set forth in the accompanying drawings and the description below. Other features, objects, and advantages will be apparent from the description, drawings, and claims.

DETAILED DESCRIPTION

Figure 1:
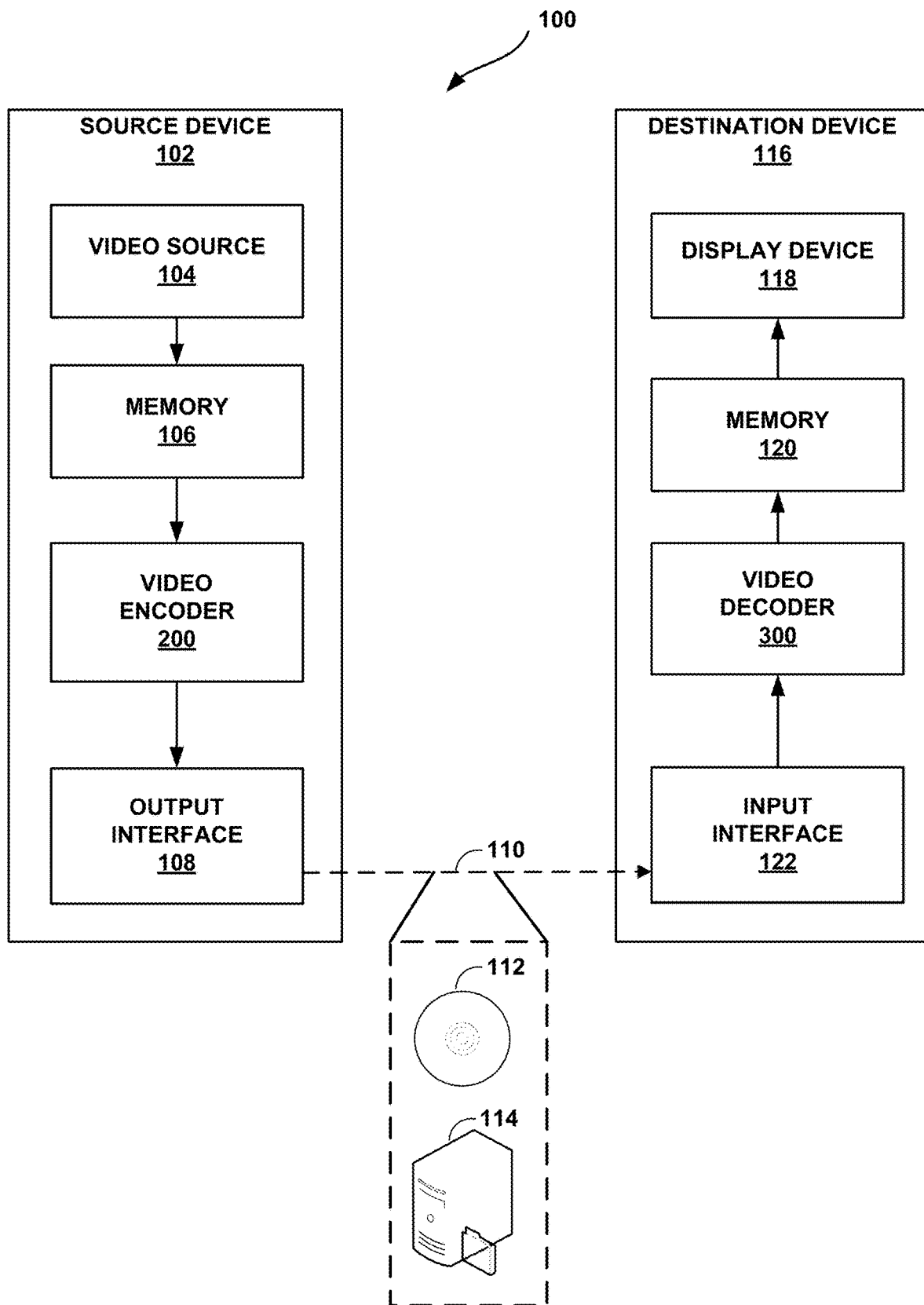
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

More specifically, in many examples, this disclosure describes techniques that can improve decoder-side motion vector refinement (DMVR) processes performed by video decoder. For example, according to this disclosure, the search area associated with a DMVR process may be defined in an adaptive way such that different sizes or shapes of the search area may be used in different situations (e.g., for different video blocks being coded). In some cases, the search area associated with a DMVR process may be determined based on one or more characteristics associated with a video block being coded, such based on block size, block dimensions, resolution, or other factors. Also, this disclosure contemplates signaling techniques whereby the size (e.g., one or more dimensions) of the DMVR search area can be defined based on data that is encoded in a bitstream. The signaling may be used to define the DMVR search area in combination with determinations of block characteristics or as an alternative to determinations of block characteristics. In any case, the search area associated with a DMVR process may be adaptive, which can provide flexibility in the video decoding process and may improve video quality.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video decoder 300 of destination device 116 may be configured to apply the techniques for that can improve DMVR processes. In general, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital decoding device may perform techniques of this disclosure during an DMVR process. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, $18^{th}$ Meeting: by teleconference, 22 Jun.-1 Jul. 2020, JVET-S2001-vH (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

The techniques of this disclosure are related to decoder-side motion vector derivation techniques (e.g., template matching, bilateral matching, decoder-side MV refinement, or other decoder-side motion vector derivation techniques). The techniques ay be applied in any of the existing video codecs, such as HEVC (High Efficiency Video Coding), VVC (Versatile Video Coding), Essential Video Coding (EVC) or be an efficient coding tool in any future video coding standards. In the following discussion, HEVC and JEM techniques and on-going works in VVC are discussed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a video coding standard named High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). One recent HEVC draft specification, and referred to as HEVC WD hereinafter, is available from http://phenix.int-evry.fr/j ct/doc_end_user/documents/14_Vienna/wg11/JCTVC-N1003-v1.zip ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. The latest version of reference software, i.e., VVC Test Model 10 (VTM 10.0) could be downloaded from: https://vcgit.hhi.fraunhofer.de/jvet/VVCSoftware_VTM An algorithm description of Versatile Video Coding and Test Model 10 (VTM 10.0) could be referred to JVET-S2002.

CU Structure and Motion Vector Prediction in HEVC will now be discussed. In HEVC, the largest coding unit in a slice is called a coding tree block (CTB) or coding tree unit (CTU). A CTB contains a quad-tree the nodes of which are coding units.

The size of a CTB can be ranges from 16×16 to 64×64 in the HEVC main profile (although technically 8×8 CTB sizes can be supported). A coding unit (CU) could be the same size of a CTB to as small as 8×8. Each coding unit is coded with one mode, i.e. inter or intra. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU. When the CU is inter coded, each PU has one set of motion information, which is derived with a unique inter prediction mode.

Motion Vector Prediction will now be discussed. In HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list may contain up to 5 candidates for the merge mode and may contain only two candidates for the AMVP mode.

A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. The candidates for both modes may be derived similarly from the same spatial and temporal neighboring blocks.

Spatial Neighboring Candidates will now be discussed. Spatial MV candidates may be derived from the neighboring blocks, such as shown in FIGS. 5A and 5B, for a specific PU ($PU_0$), although the methods for generating the candidates from the blocks may differ for merge and AMVP modes.

Figure 5B:
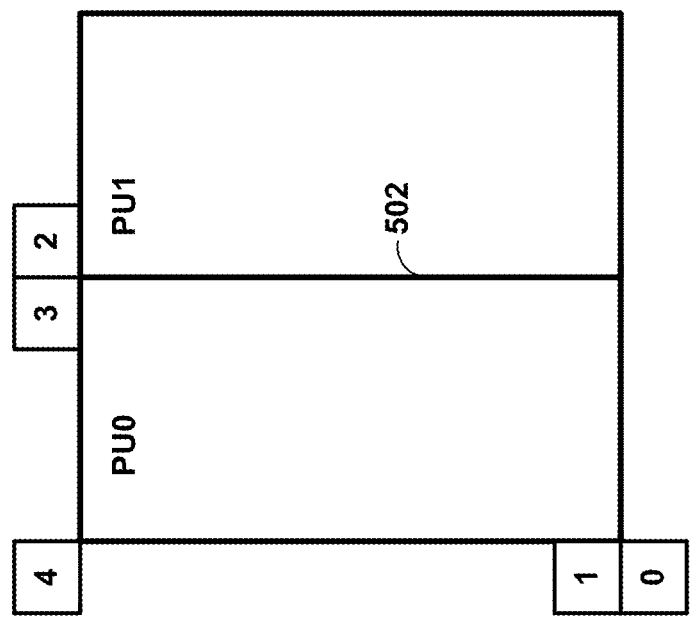
FIG. 5B is a conceptual diagram illustrating spatially neighboring MV candidates used in an example advanced motion vector prediction (AMVP) mode.
Figure 5A:
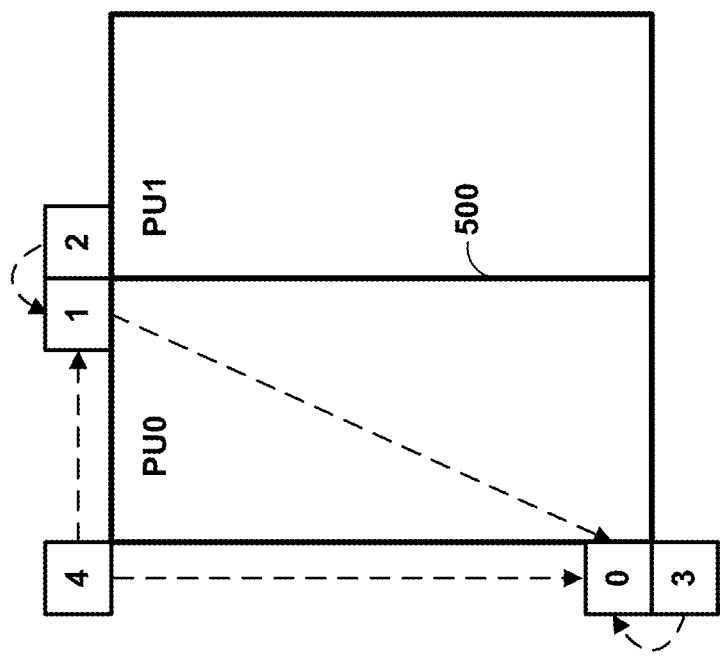
FIG. 5A is a conceptual diagram illustrating spatially neighboring motion vector (MV) candidates used in an example merge mode

In a merge mode, up to four spatial MV candidates can be derived with the orders showed in FIG. 5A with numbers, and the order is the following: left (0, A1), above (1, B1), above right (2, B0), below left (3, A0), and above left (4, B2), as shown in FIG. 5A.

In AVMP mode, the neighboring blocks may be divided into two groups: left group consisting of the block 0 and 1, and above group consisting of the blocks 2, 3, and 4 as shown in FIG. 5B. For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

Temporal Motion Vector Prediction in HEVC will now be discussed. A temporal motion vector predictor (TMVP) candidate, if enabled and available, may be added into the MV candidate list after spatial motion vector candidates. The process of motion vector derivation for TMVP candidate may be the same for both merge and AMVP modes, however, in some examples, the target reference index for the TMVP candidate in the merge mode is always set to 0.

Figures 6A, 6B:
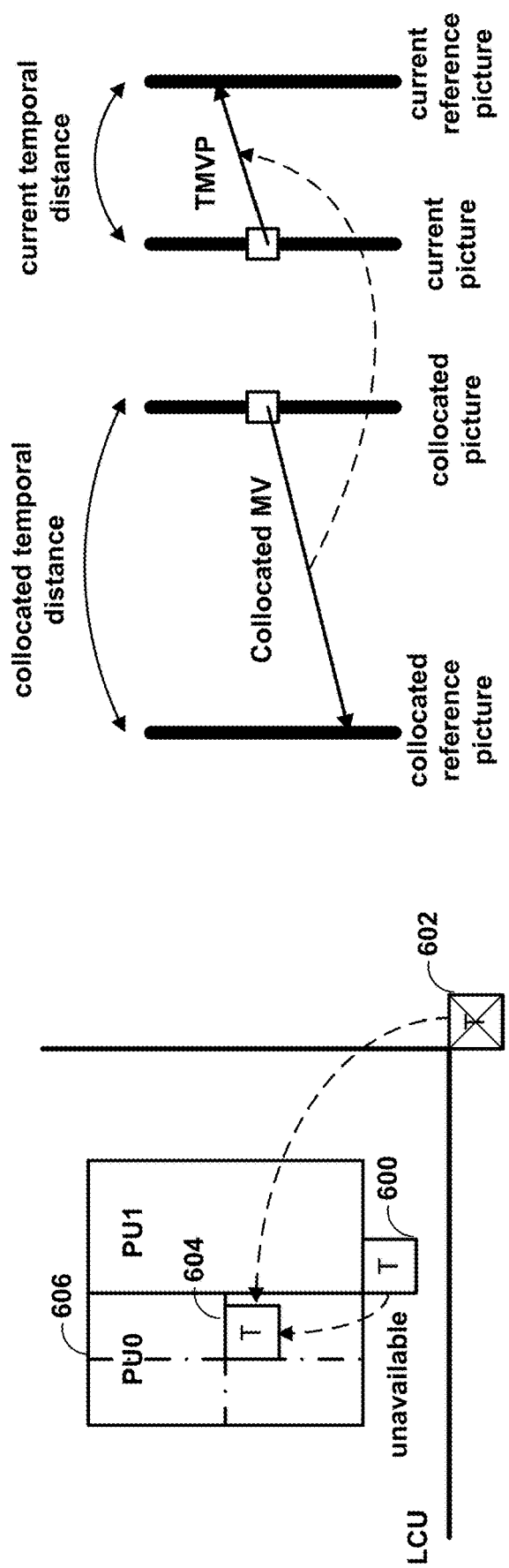
FIG. 6A is a conceptual diagram illustrating a temporal motion vector candidate that may be used for temporal motion vector prediction (TMVP).
FIG. 6B is a conceptual diagram illustrating motion vector scaling.

The primary block location for TMVP candidate derivation may be the bottom right block outside of the collocated PU as shown in FIG. 6A as a block "T", to compensate the bias to the above and left blocks used to generate spatial neighboring candidates. However, if that block is located outside of the current CTB row or motion information is not available, the block may be substituted with a center block of the PU.

A motion vector for TMVP candidate is derived from the co-located PU of the co-located picture, indicated in the slice level. The motion vector for the co-located PU is called collocated MV.

Similar to temporal direct mode in AVC, to derive the TMVP candidate motion vector, the co-located MV may need to be scaled in order to compensate the temporal distance differences, such as shown in FIG. 6B.

Other Aspects of Motion Prediction in HEVC will now be discussed. Several aspects of merge and AMVP modes will be discussed.

Motion vector scaling will now be discussed. In some examples, it is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture may be calculated based on the Picture Order Count (POC) values.

In some examples, for a motion vector to be predicted, both its associated containing picture and reference picture may be different. Therefore, a new distance (based on POC) can be calculated. And the motion vector can be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation will now be discussed. In some examples, if a motion vector candidate list is not complete, artificial motion vector candidates are generated and inserted at the end of the list until it will have all candidates. In some examples of merge mode, there are two types of artificial MV candidates: combined candidate derived only for B-slices and zero candidates used only for AMVP if the first type doesn't provide enough artificial candidates.

For each pair of candidates that are already in the candidate list and have necessary motion information, bi-directional combined motion vector candidates may be derived by a combination of the motion vector of the first candidate referring to a picture in the list 0 and the motion vector of a second candidate referring to a picture in the list 1.

Pruning process for candidate insertion will now be described. Candidates from different blocks may happen to be the same, which decreases the efficiency of a merge/AMVP candidate list. A pruning process may be applied to solve this problem. In some examples, a pruning process may compare one candidate against the others in the current candidate list to avoid inserting an identical candidate to the list. To reduce the complexity, only limited numbers of pruning process may be applied instead of comparing each potential one with all the other existing ones.

Template Matching Prediction will now be described. Template matching (TM) prediction is a special merge mode based on Frame-Rate Up Conversion (FRUC) techniques. With this mode, motion information of a block is not signalled but derived at decoder side. It is applied to both AMVP mode and regular merge mode. In AMVP mode, MVP candidate selection is determined base template matching to pick up the one which reaches the minimal difference between current block template and reference block template. In regular merge mode, a TM mode flag is signalled to indicate the use of TM and then TM is applied to the merge candidate indicated by merge index for MV refinement.

Figure 7:
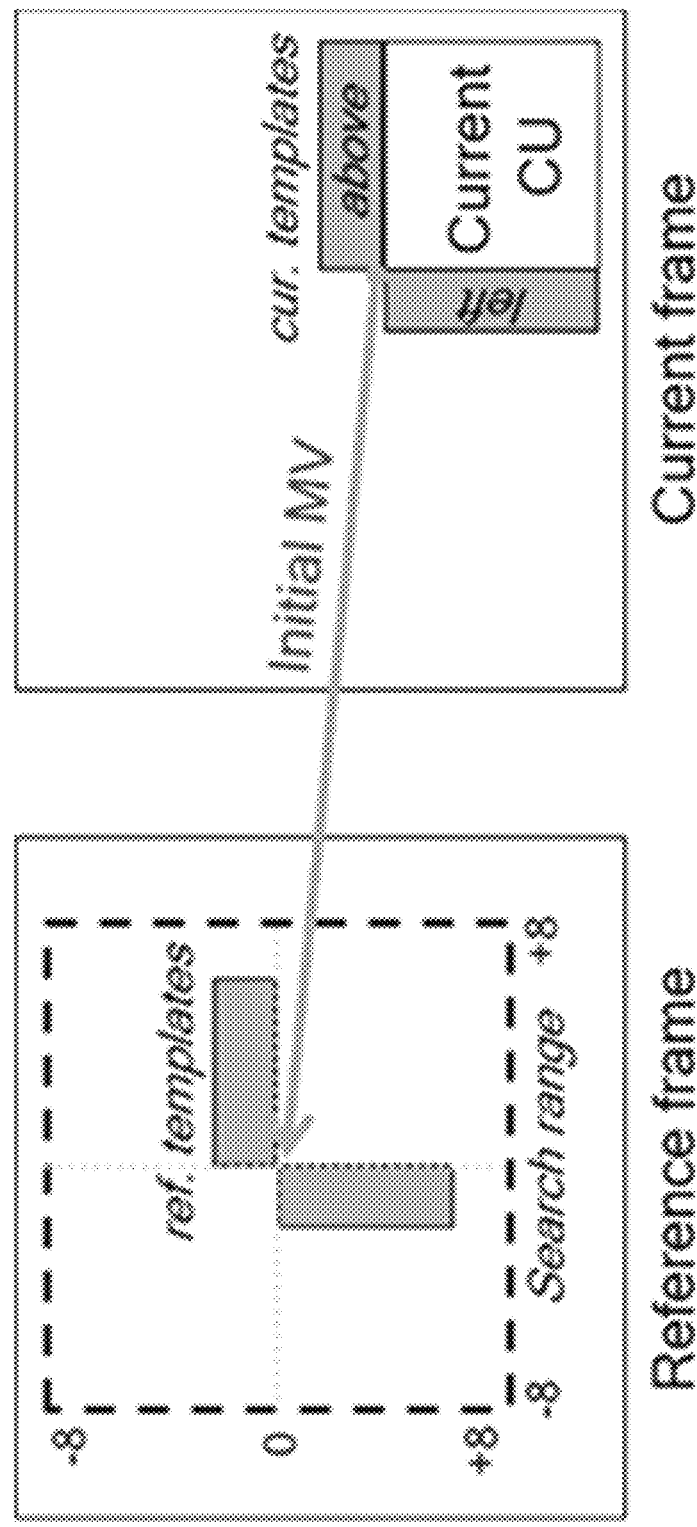
FIG. 7 is a conceptual diagram showing template matching within a search area (e.g., a search range) around an initial motion vector.

As shown in FIG. 7, template matching may be used to derive motion information of the current CU by finding the closest match between a template (e.g., a top and/or left neighbouring blocks of the current CU) in the current picture and a block (same size to the template) in a reference picture. With an AMVP candidate selected based on initial matching error, its MVP is refined by template matching. With a merge candidate indicated by signaled merge index, its merged MVs corresponding to L0 and L1 are refined independently by template matching and then the less accurate one is further refined again with the better one as a prior.

Cost functions will now be described. When a motion vector points to a fractional sample position, motion compensated interpolation may be needed. To reduce complexity, bi-linear interpolation instead of regular 8-tap DCT-IF interpolation can be used for both template matching to generate templates on reference pictures. The matching cost C of template matching may be calculated as follows:

$$C = SAD + w \cdot (|MV_x - MV_x^s| + |MV_y - MV_y^s|)$$

where w is a weighting factor which is empirically set to 4, MV and $MV^s$ indicate the currently testing MV and the initial MV (i.e., a MVP candidate in AMVP mode or merged motion in merge mode), respectively. SAD refers to "sum of absolute difference" and may be used as the matching cost of template matching. Sum of squared difference (SSD) may also be used.

When TM is used, motion may be refined by using luma samples only. The derived motion will be used for both luma and chroma for MC inter prediction. After MV is decided, final MC is performed using 8-taps interpolation filter for luma and 4-taps interpolation filter for chroma Search methods will now be discussed. MV refinement may comprise a pattern based MV search with the criterion of template matching cost. Two search patterns may be supported—e.g., a diamond search and a cross search for MV refinement. The MV may be directly searched at quarter luma sample MVD accuracy with diamond pattern, followed by quarter luma sample MVD accuracy with cross pattern, and then this is followed by one-eighth luma sample MVD refinement with cross pattern. The search range of MV refinement is set equal to (−8, +8) luma samples around the initial MV.

Bilateral Matching Prediction will now be discussed. Bilateral Matching (a.k.a Bilateral Merge) (BM) prediction is another merge mode base on Frame-Rate Up Conversion (FRUC) techniques. When a block is determined to apply the BM mode, two initiate motion vectors MV0 and MV1 are derived by using a signaled merge candidate index to select the merge candidate in a constructed merge list. Bilateral Matching search around the MV0 and MV1. The final MV' and MV1' are derived base on the minimum Bilateral Matching cost.

Figure 8:
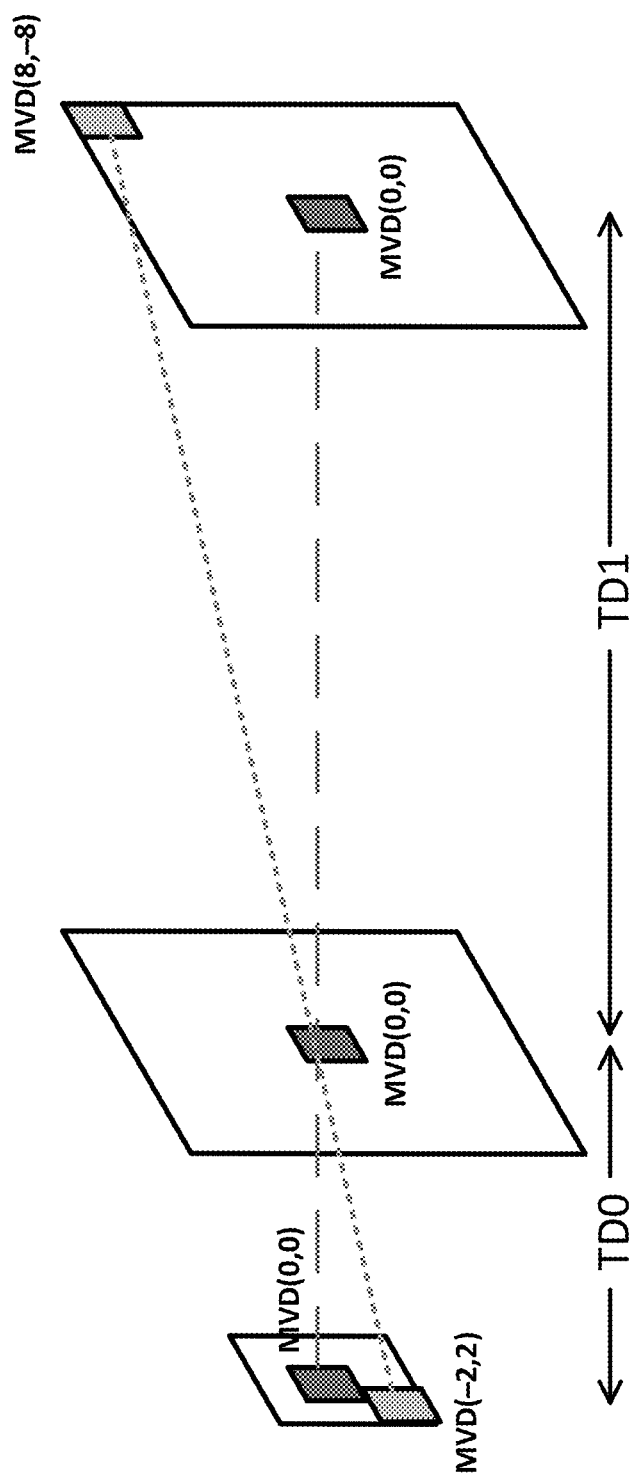
FIG. 8 is a conceptual diagram showing an example using bilateral matching prediction whereby MVD0 and MVD1 are proportional based on the temporal distances from a block being coded.
Figure 9:
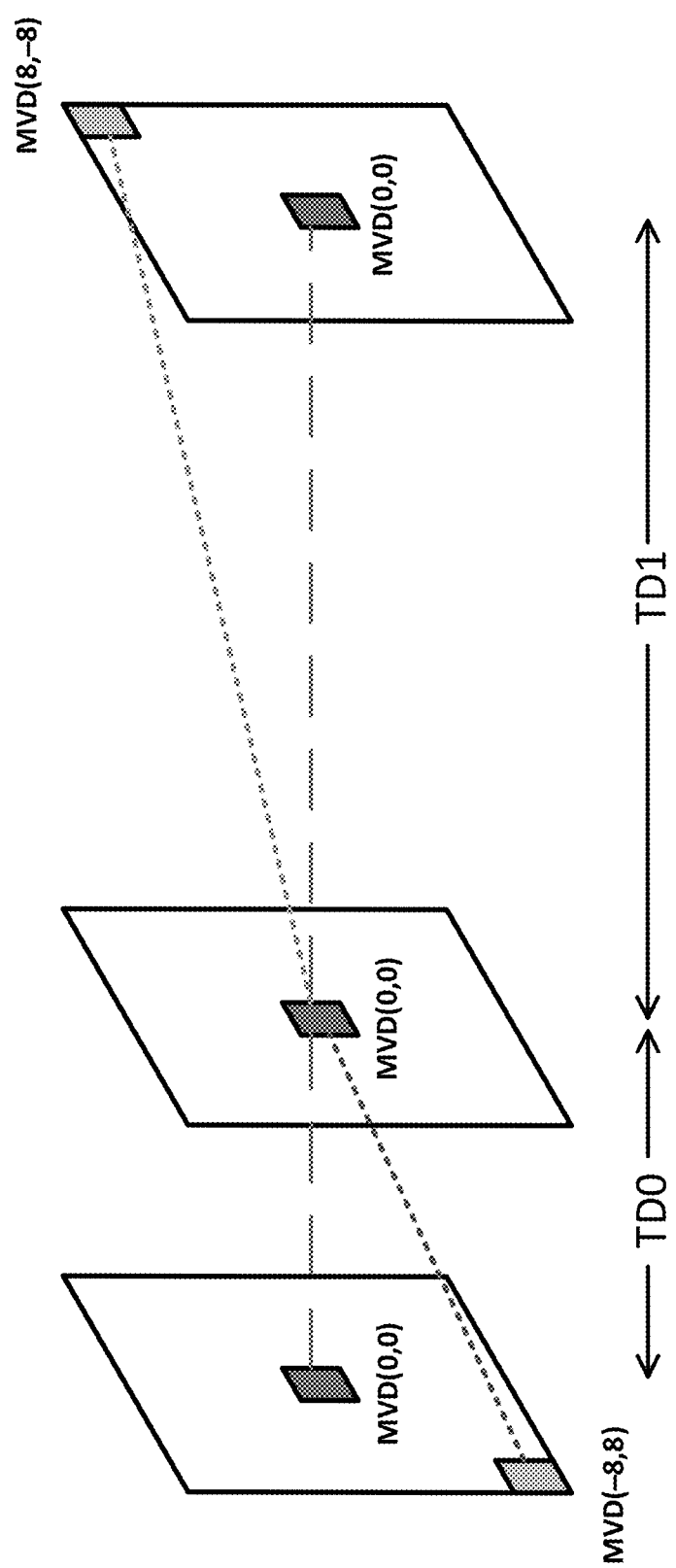
FIG. 9 is a conceptual diagram showing an example using bilateral matching prediction whereby MVD0 and MVD1 are mirrored regardless of temporal distances from the block being coded.

The motion vector difference MVD0 (denoted by MV'-MV0) and MVD1 (denoted by MV1'-MV1) pointing to the two reference blocks shall be proportional to the temporal distances (TD), e.g. TD0 and TD1, between the current picture and the two reference pictures. FIG. 8 shows an example of MVD0 and MVD1 wherein, the TD1 is 4 times of TD0. In the example shown in FIG. 8, MVD0 and MVD1 are proportional base on the temporal distances However, there is an optional design that MVD0 and MVD1 are mirrored regardless of the temporal distances TD0 and TD1. FIG. 9 shows an example of mirrored MVD0 and MVD1 wherein, the TD1 is 4 times of TD0.

Bilateral Matching may be implemented. Bilateral Matching performs a local search around the initial MV0 and MV1 to derive the final MV0' and MV1'. The local search applies a 3×3 square search pattern to loop through the search range [−8, 8]. In each search iteration, the bilateral matching cost of the eight surrounding MVs in the search pattern are calculated and compared to the bilateral matching cost of center MV. The MV which has minimum bilateral matching cost becomes the new center MV in the next search iteration. The local search is terminated when the current center MV has a minimum cost within the 3×3 square search pattern or when the local search reaches the pre-defined maximum search iteration.

Figure 10:
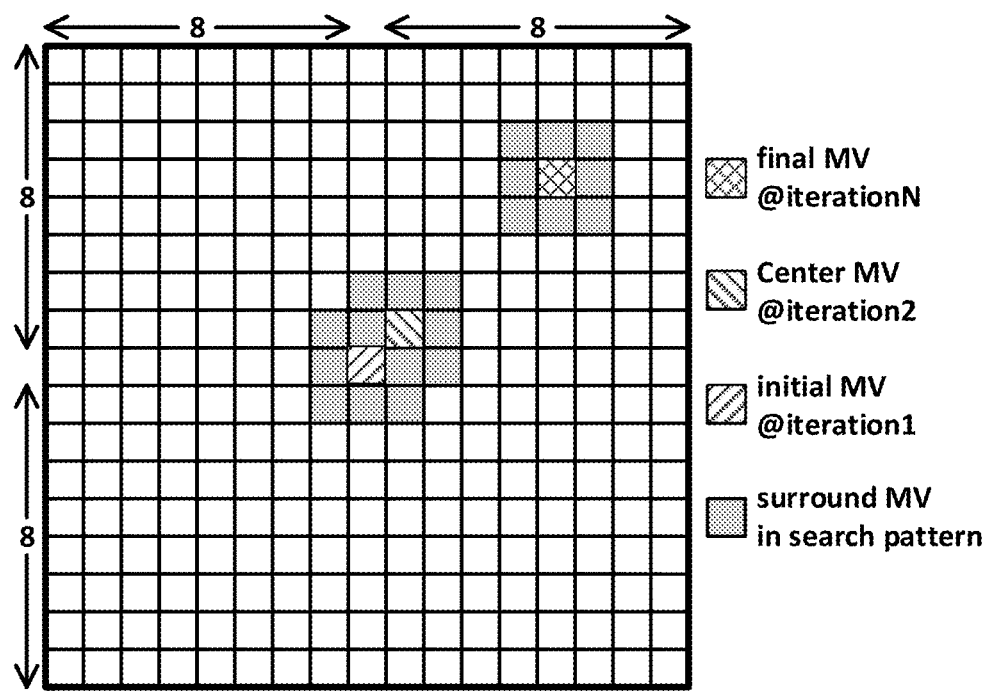
FIG. 10 is a conceptual diagram showing an example 3×3 square search pattern used in an example search area defined by a search range of [−8, 8].

FIG. 10 shows an example of the 3×3 square search pattern in the search range [−8, 8].

Figure 11:
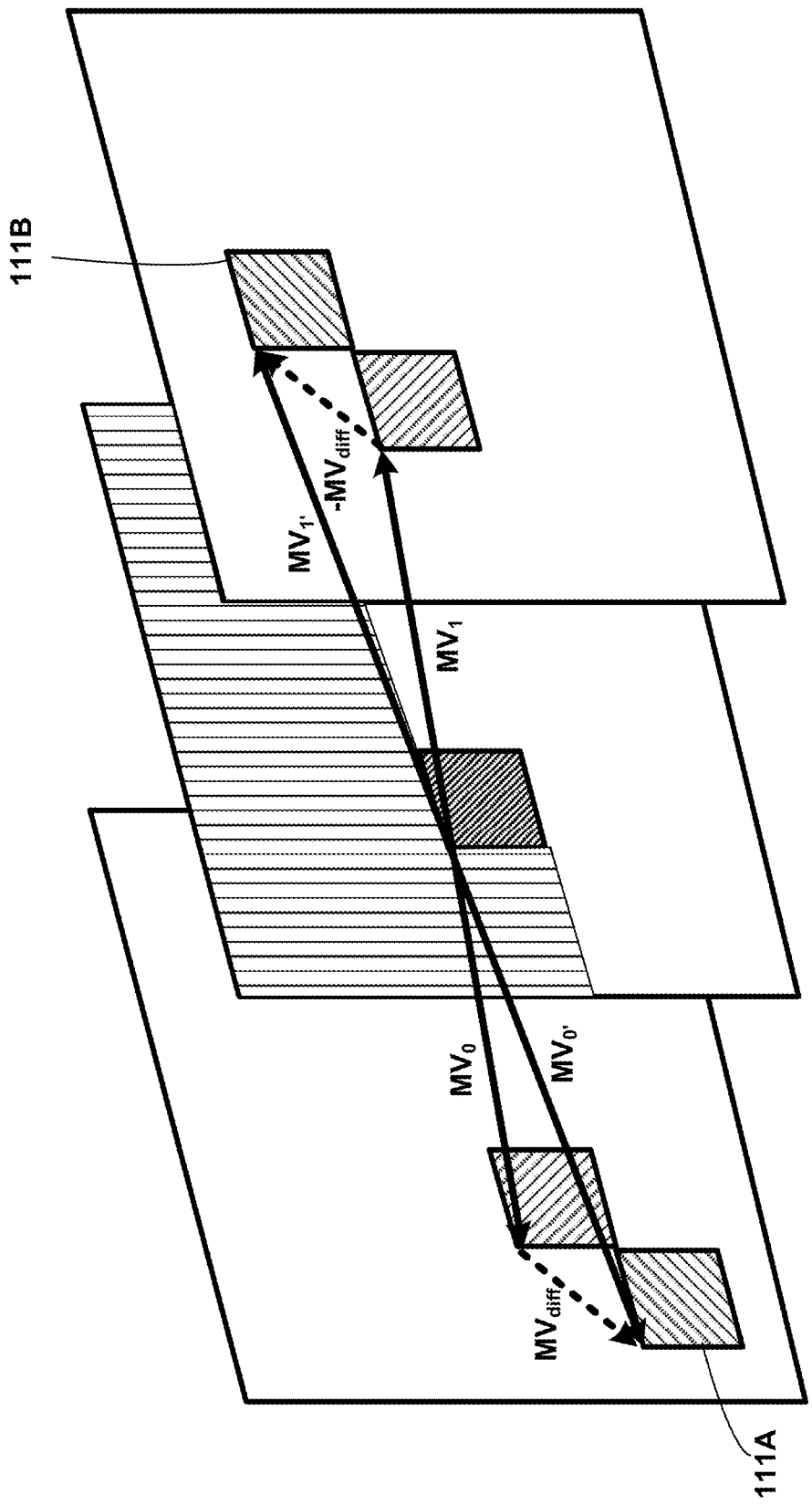
FIG. 11 is a conceptual diagram showing an example of decoder side motion vector refinement (DMVR).

Decoder-side Motion Vector Refinement will now be discussed. To increase the accuracy of the MVs of the merge mode, a decoder side motion vector refinement (DMVR) is applied in VVC. In bi-prediction operation, a refined MV is searched around the initial MVs in the reference picture list L0 and reference picture list L1. The DMVR method calculates the distortion between the two candidate blocks in the reference picture list L0 and list L1. FIG. 11 illustrates an example of motion vector refinement. As illustrated in FIG. 11, the SAD between blocks 111A and 111B based on each MV candidate around the initial MV is calculated. The MV candidate with the lowest SAD becomes the refined MV and used to generate the bi-predicted signal.

The refined MV derived by DMVR process may be used to generate the inter prediction samples and also used in temporal motion vector prediction for future pictures coding. While the original MV may be used in deblocking process and also used in spatial motion vector prediction for future CU coding.

In some examples, DMVR is a sub-block based merge mode with a pre-defined maximum processing unit of 16×16 luma samples. When the width and/or height of a CU are larger than 16 luma samples, it will be further split into subblocks with width and/or height equal to 16 luma samples.

A searching scheme will now be discussed. In DVMR, the search points are surrounding the initial MV and the MV offset may obey the MV difference mirroring rule. In other words, any points that are checked by DMVR, denoted by candidate MV pair (MV0, MV1) may obey the following two equations:

$$MV0' = MV0 + MV\_offset$$

$$MV1' = MV1 - MV\_offset$$

where MV_offset represents the refinement offset between the initial MV and the refined MV in one of the reference pictures. In some examples, the refinement search range is two integer luma samples from the initial MV. The searching may include the integer sample offset search stage and fractional sample refinement stage.

In some examples, a 25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, in some examples, it is proposed to favor the original MV during the DMVR process. The SAD between the reference blocks referred by the initial MV candidates is decreased by ¼ of the SAD value.

The integer sample search may be followed by fractional sample refinement. To save the calculational complexity, the fractional sample refinement may be derived by using parametric error surface equation, instead of additional search with SAD comparison. In some examples, the fractional sample refinement is conditionally invoked based on the output of the integer sample search stage. When the integer sample search stage is terminated with center having the smallest SAD in either the first iteration or the second iteration search, the fractional sample refinement may be further applied.

In parametric error surface based sub-pixel offsets estimation, the center position cost and the costs at four neighboring positions from the center may be used to fit a 2-D parabolic error surface equation of the following form $$E(x,y)=A(x-x_{min})^2+B(y-y_{min})^2+C$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0)))$$

$$y_{min}=(E(0,-1)-E(0,1))/(2(E(0,-1)+E(0,1)-2E(0,0)))$$

In some cases, the value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ may be added to the integer distance refinement MV to get the sub-pixel accurate refinement delta MV.

Bilinear-interpolation and sample padding will now be described. In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter may be used to generate the fractional samples for the searching process in DMVR. Another important effect of using bi-linear filter is that with 2-sample search range, the DVMR does not access more reference samples compared to the normal motion compensation process. After the refined MV is attained with DMVR search process, the normal 8-tap interpolation filter may be applied to generate the final prediction. In order to not access more reference samples to normal MC process, the samples, which are not needed for the interpolation process based on the original MV but are needed for the interpolation process based on the refined MV, may be padded from those available samples.

Enabling conditions are now discussed. In some examples, DMVR is enabled if the following conditions are all satisfied (or some defined subset thereof).
  CU level merge mode with bi-prediction MV
  One reference picture is in the past and another reference picture is in the future with respect to the current picture
  The distances (i.e. POC difference) from both reference pictures to the current picture are same
  CU has more than 64 luma samples
  Both CU height and CU width are larger than or equal to 8 luma samples
  BCW weight index indicates equal weight
  WP is not enabled for the current block
  CIIP mode is not used for the current block In the current version of VVC, the decoder-side motion vector refinement (DMVR) method has a fix search range [−2, 2] for all DMVR coded blocks. The current fix search range is too small for some blocks. For the blocks that have a best refined MV out of the current fix search range, the DMVR process can not find an optimal delta MV within the current fix search range. Increasing the DMVR search range is a possible solution for this problem.

However, increasing the search range to a fixed big search range e.g. [−8, 8] increases the DMVR process complexity. For example, when increased to a fix search range [−8, 8], the process may need to do more than 11 times DMVR searches compared to a search range [−2, 2] for a DMVR coded block. In the other hand, a fixed big search range is too big for some blocks. For the blocks that have a small dimension e.g. 4×4, the determined delta MV can be ±8 pel in horizontal and ±8 pel in vertical shift from the initial MV. The reference picture can have a completely different pattern at the refined MV compared to the initial MV. This problem can impact the coding performance for a DMVR coded block.

According one or more examples of this disclosure, a block-adaptive search range may be used in the DMVR process. In some examples, the local search area of DMVR (bilateral search or template matching) for a coding block may be determined based on the coding block dimension (i.e., width and height of a coding unit or those of sub-blocks inside a CU). The coding block could be also a CU, a PU or a sub PU, the coding block could have either a square or rectangular shape.

In some examples, given a W×H coding block, wherein, W is the width of the coding block, H is the height of the coding block, the local search area of DMVR for the coding block has a horizontal search range [−sHor, sHor] and a vertical search range [−sVer, sVer]. The local search area for the coding block is (2×sHor+1)×(2×sVer+1). In the current VTM, both the value of sHor and the value of sVer equal to 2 for all coding blocks.

In some examples, a video decoder may determine the value of sHor and sVer based on the value of W and H of the coding block. One example is to determine the value of sHor and sVer by eq.1:

$$sHor=W \times sFactor$$

$$sVer=H \times sFactor \quad \quad (eq.\ 1)$$

wherein, the sFactor is greater than 0, the sFactor can be either less than 1, equal to 1 or greater than 1. In one example, sFactor is equal to 0.5, the search range of DMVR for a W×H coding block is shown in Table 1. The coding block is a sub PU, which has minimum dimension 4×4 and maximum dimension 16×16.

TABLE 1

|        | W = 4 | W = 8 | W = 16 |
|--------|-------|-------|--------|
| H = 4  | sHor = 2, sVer = 2 <br> searchArea = 5 × 5 | sHor = 4, sVer = 2 <br> searchArea = 9 × 5 | sHor = 8, sVer = 2 <br> searchArea = 17 × 5 |
| H = 8  | sHor = 2, sVer = 4 <br> searchArea = 5 × 9 | sHor = 4, sVer = 4 <br> searchArea = 9 × 9 | sHor = 8, sVer = 4 <br> searchArea = 17 × 9 |
| H = 16 | sHor = 2, sVer = 8 <br> searchArea = 5 × 17 | sHor = 4, sVer = 8 <br> searchArea = 9 × 17 | sHor = 8, sVer = 8 <br> searchArea = 17 × 17 |

As the coding complexity increases when the DMVR search area increases, in some examples, it may be desirable to set a maximum search range [−sMax, sMax]. The value of sHor and sVer are then determined by eq.2:

$$sHor = \text{minimum}(sMax, W \times sFactor)$$

$$sVer = \text{minimum}(sMax, H \times sFactor) \quad \text{(eq. 2)}$$

In another example, the local search area for a coding block is determined base on the resolution of the video sequence. Generally, a large search area may be used for sequence with large resolution, a small search area may be used for sequence with small resolution. In one example, 17×17 search area is used for sequence with picture area larger than 1920*1080, 5×5 search area is used for sequence with picture area smaller than 1080*720, and 9×9 is used for the other sequences. In some examples, the search area for blocks of a video sequence may be defined based on resolution of that sequence, and in other examples, resolution may be a factor that is used in combination with block characteristics to define the search area for blocks in an adaptive way. The resolution may set an upper and/or lower bound on the size or dimensions of the search area in some examples, and block characteristics may define the search area on a block-by-block basis within the upper and lower bounds.

In another example, the search area can be signaled at high-level syntax (e.g., slice header, picture header, sub-picture header, picture parameter set, sequence parameter set, video parameter set, adaptation parameter set, et al.). The search area may be signaled as an index to a predefined set of search area. The search area may be square signaled as integer values indicating the width of the area or may be rectangular signaled as a pair of integer values indicating respectively the width and height of the area. Signaling the search range or search area may be an alternative to derivation of the search area in some examples, and signaling the search range or search area may be used in combination with the derivation of the search area (based on block characteristics) in other examples Delta MV search and match cost tuning will now be discussed. In some examples, DMVR processes may be changed to modify the matching cost (of DMVR or bilateral matching) at a delta MV, i.e. MV($\Delta$hor, $\Delta$ver). The initial MV may define a delta MV(0, 0). The matching cost (bilCost) may be defined as the distortion between $I_0(x+v_0+\Delta)$ and $I_1(x+v_1-\Delta)$, where $I_0$ and $I_1$ are reference pictures in reference picture list 0 and 1, respectively, x is the coordinate of a current-block sample in the current picture, and $v_0$ and $v_1$ are motion vectors associated with respective reference pictures. The distortion function may be defined by Sum of Absolute Difference (SAD), Sum of Absolute Transformed Difference (SATD), Mean Removed Sum of Absolute Difference (MR-SAD), Mean Removed Sum of Absolute Transformed Difference (MR-SATD) or another distortion function. The delta MV is within the local search area. The modified matching cost (bilCost') may be defined as eq.3:

$$bilCost' = bilCost \times costFactor(\Delta hor, \Delta ver) \quad \text{(eq. 3)}$$

where the value of costFactor($\Delta$hor, $\Delta$ver) can be smaller than 1, equal to 1 or greater than 1. A small costFactor($\Delta$hor, $\Delta$ver) may be used for a delta MV which is close to the initial MV, whereas a big costFactor($\Delta$hor, $\Delta$ver) may be used at a delta MV which is away from the initial MV.

In some examples, the techniques of this disclosure can be adapted to apply to template matching by replacing $I_0(x+v_0+\Delta)$ and $I_1(x+v_1-\Delta)$ to $I_c(x)$ and $I_r(x+v+\Delta)$, respectively, where $I_c$ denotes the reconstructed part of the current picture and $I_r$ represents a reference picture associated with the given motion vector v and x is the coordinate of a sample in current block template in the current picture. Based on the adaptation, some or all of processes described herein may be applied directly to template matching (e.g., by replacing the key words—bilateral and DMVR within this disclosure).

Figure 12:
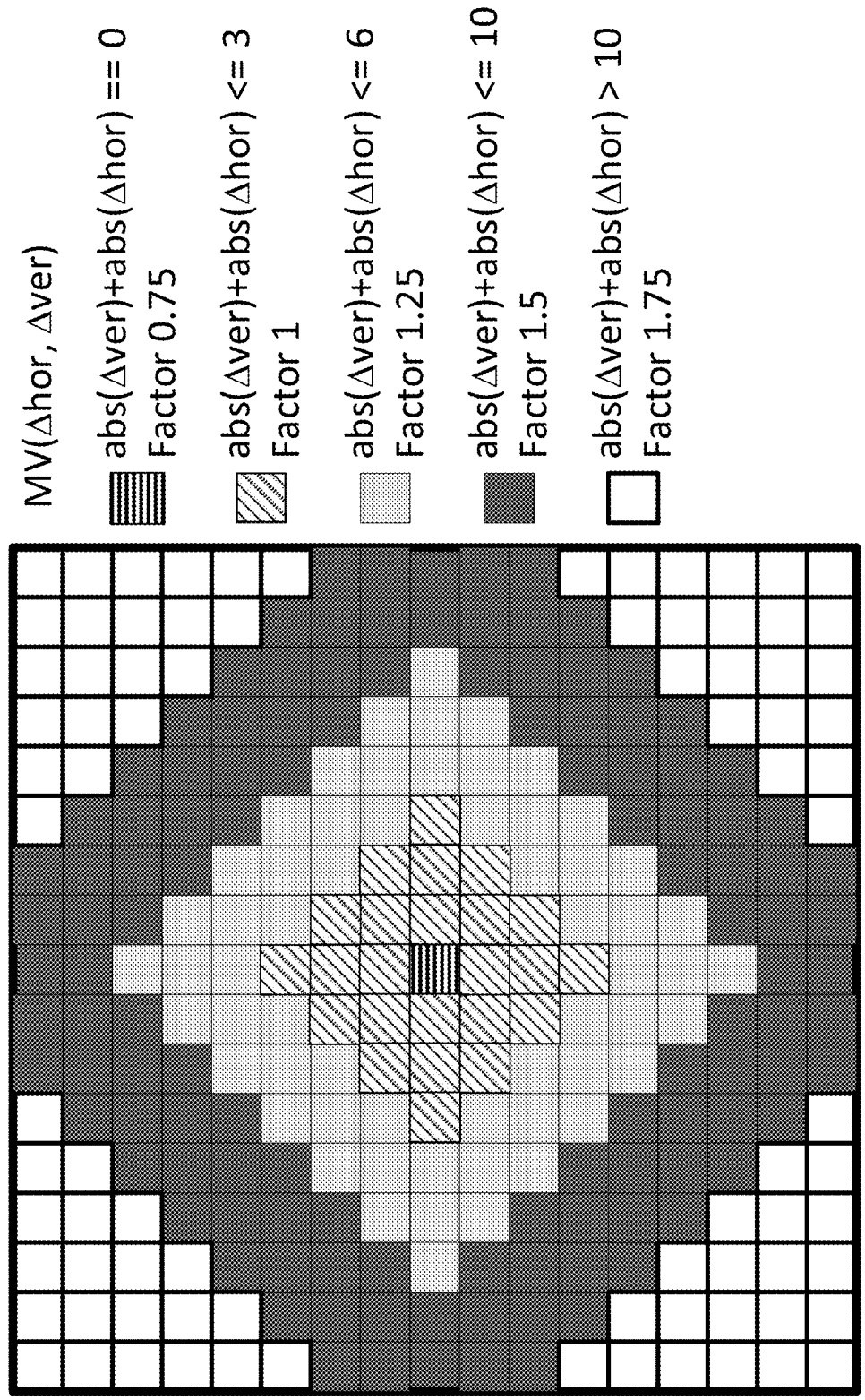
FIG. 12 is a conceptual diagram showing an example diamond searching pattern with different cost functions, e.g., defined by costFactor(Δhor, Δver) at a delta MV(Δhor, Δver).

In some examples, a diamond pattern bilateral match cost tuning process may be used. FIG. 12 illustrates an example of a diamond pattern that may be used within a search area to assess cost and distortion associated with candidates in the search area. For example, given a 17×17 search area (also referred to as a "local search area"), one example is to determine the costFacor($\Delta$hor, $\Delta$ver) as follows:

```
if ( (abs(Δhor) + abs(Δver)) == 0 )
   costFactor(0, 0) = 0.75
else if( (abs(Δhor) + abs(Δver)) <= 3 )
   costFactor(Δhor, Δver) = 1
else if( (abs(Δhor) + abs(Δver)) <= 6 )
   costFactor(Δhor, Δver) = 1.25
else if( (abs(Δhor) + abs(Δver)) <= 10 )
   costFactor(Δhor, Δver) = 1.5
else
   costFactor(Δhor, Δver) = 1.75
```

Again, this example of costFactor($\Delta$hor, $\Delta$ver) at a delta MV($\Delta$hor, $\Delta$ver) is shown as in FIG. 12

Figure 13:
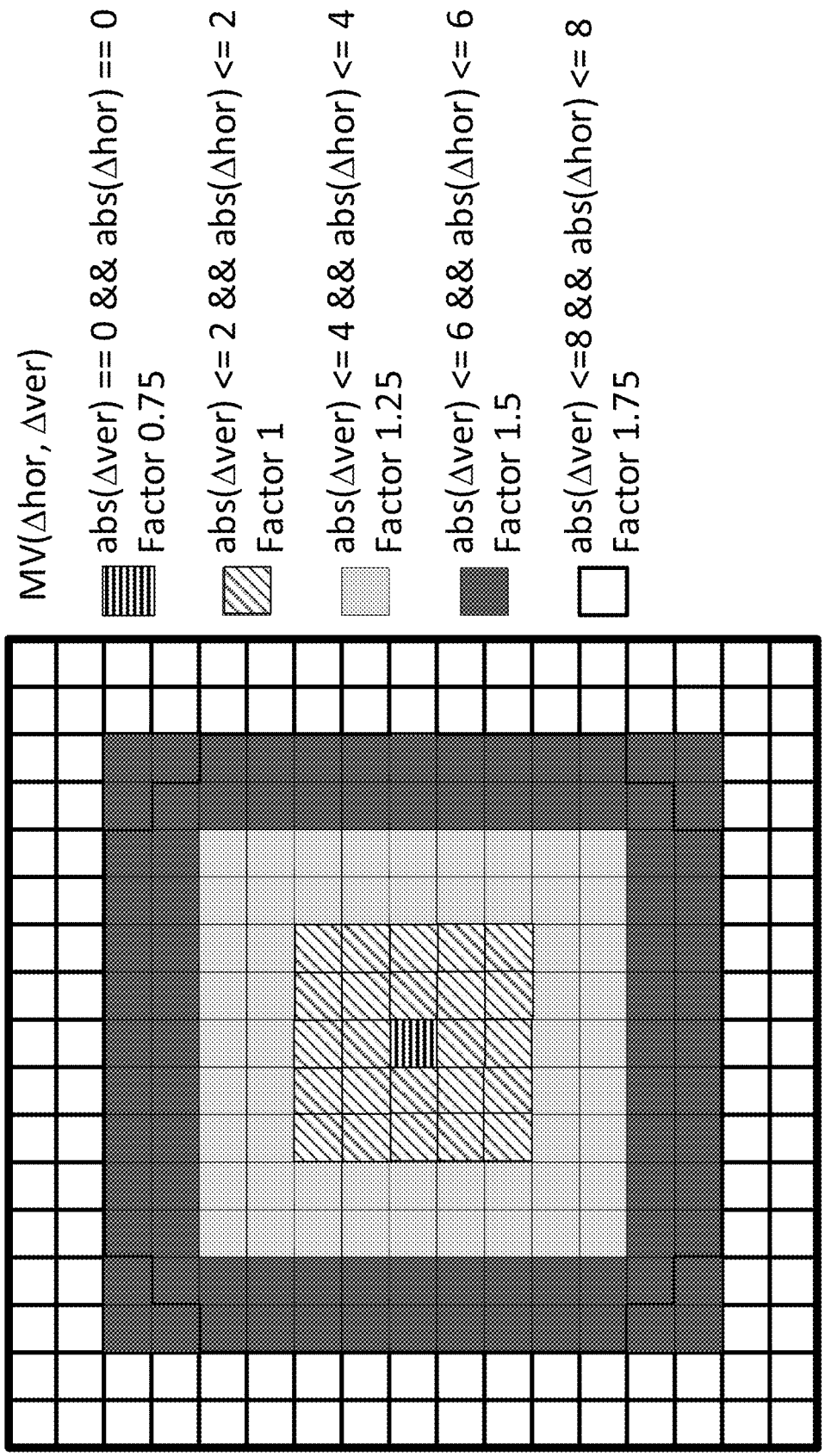
FIG. 13 is a conceptual diagram showing an example square searching pattern with different cost functions, e.g., defined by costFactor(Δhor, Δver) at a delta MV(Δhor, Δver).

In other examples, a square pattern bilateral match cost tuning process may be used. FIG. 13 illustrates an example of a square pattern bilateral match cost tuning process that may be used within a search area to assess cost and distortion associated with candidates in the search area. Given a 17×17 local search area, one example is to determine the costFacor($\Delta$hor, $\Delta$ver) as follows:

```
if ( (abs(Δhor) == 0 && abs(Δver)) == 0 )
   costFactor(0, 0) = 0.75
else if( (abs(Δhor) <= 2) && (abs(Δver)) <= 2) )
   costFactor(Δhor, Δver) = 1
else if( (abs(Δhor) <= 4) && (abs(Δver)) <= 4) )
   costFactor(Δhor, Δver) = 1.25
else if( (abs(Δhor) <= 6) && (abs(Δver) <= 6) )
   costFactor(Δhor, Δver) = 1.5
else
   costFactor(Δhor, Δver) = 1.75
```

Again, this example of costFactor ($\Delta$hor, $\Delta$ver) at a delta MV($\Delta$hor, $\Delta$ver) is shown as in FIG. 13.

Techniques for possible early termination of delta MV searching will now be discussed. In general, searching for delta MV within a search area may occur with respect to all candidates in the search space, but in some cases, it may be desirable to allow the decoder to terminate the search early if an adequate candidate is identified before considering all candidates. The decision to terminate the search early could be made on a block-by-block bases or a region-by-region basis. In some examples, the sets of blocks with different cost factors shown in FIGS. 12 and 13 could define regions, and searching in more outer regions may be performed only if an acceptable candidate is not identified in a more inner region.

In some examples, a decoder implemented a process according to this disclosure may define a threshold (costTh) for the match cost of DMVR (bilateral merge or template matching). When the modified bilateral match cost (bilCost') is smaller than the costTh at the current delta MV, the delta MV search process can be terminated and finished. And in this example, the current delta MV can be used to derive the refined MV without considering addition candidates.

One example of the costTh is defined as the cost per pixel in the currently refined coding block. Given a W×H coding block, the costTh is equal to (K×W×H). Wherein the K is a constant value, which represent the cost per pixel. When K is equal to 1, the costTh is equal to (W×H) for the current coding block. As in previous examples, the coding block could be a CU, a PU or a sub PU.

Example delta MV search order will now be discussed. In some examples, inner blocks may define a lower cost factor than outer blocks (such as shown in the examples of FIGS. 12 and 13). Searching may occur from the center outward, and cost and distortion may be used to define a metric that the decoder compares to a threshold to determine if a given candidate is acceptable. In some examples, the decoder may set a search priority variable sPriority($\Delta$hor, $\Delta$ver) to each delta MV(($\Delta$hor, $\Delta$ver). A high priority value (e.g., 1) is set to a delta MV(($\Delta$hor, $\Delta$ver) at which a small costFactor ($\Delta$hor, $\Delta$ver) is applied. In other words, a high priority value is set to a delta MV($\Delta$hor, $\Delta$ver) which is close to the initial MV of the current coding block.

In some examples (which may also apply to other examples described herein), a decoder may be configured to pre-determine a priority value sPriority($\Delta$hor, $\Delta$ver) at a delta MV($\Delta$hor, $\Delta$ver) as follows:

```
if( (abs(Δhor) == 0 && abs(Δver)) == 0 )
    costFactor(0, 0) = 0.75
    sPriority(Δhor, Δver) = 1
else if( (abs(Δhor) <= 2) && (abs(Δver) <= 2) )
    costFactor(Δhor, Δver) = 1
    sPriority(Δhor, Δver) = 2
else if( (abs(Δhor) <= 4) && (abs(Δver) <= 4) )
    costFactor(Δhor, Δver) = 1.25
    sPriority(Δhor, Δver) = 3
else if( (abs(Δhor)<= 6) && (abs(Δver) <= 6) )
    costFactor(Δhor, Δver) = 1.5
    sPriority(Δhor, Δver) = 4
else
    costFactor(Δhor, Δver) = 1.75
    sPriority(Δhor, Δver) = 5
```

The best cost delta MV($\Delta$hor, $\Delta$ver) can be searched, via a decoder, by a loop from high priority value (e.g., 1) to low priority value (e.g., 5). In each priority loop, each delta MV($\Delta$hor, $\Delta$ver) may be examined from top left to bottom right. When the current delta MV($\Delta$hor, $\Delta$ver) has a priority value sPriority($\Delta$hor, $\Delta$ver) equal to the current priority loop indices value, the bilateral matching cost can be calculated by the decoder for the current delta MV($\Delta$hor, $\Delta$ver) and compared to the current best bilateral matching cost.

Given a coding block which has a search range [−8, 8] in both horizontal and vertical direction, one example pseudo code of the delta MV search is as follows:

```
for ( int priorityIdx = 1; priorityIdx < 6; priorityIdx++ )
{
    for ( int verShift = -8; verShift <= 8; verShift++ )
    {
        for ( int horShift = -8; horShift <= 8; horShift++ )
        {
            if ( sPriority(horShift, verShift) == priorityIdx )
            {
1. Calculate the matching cost for the current delta MV(horShift, verShift).
2. Apply cost tuning to the matching cost.
3. Update the best delta MV when the current tuned matching cost is smaller than the best cost.
4. When the current tuned cost is smaller than a cost threshold, terminate
    the search process.
            }
        }
    }
}
```

Extension of search methods to finer MV precision will now be discussed. The various techniques described herein can be applied to integer-pel MV refinement, half-pel MV refinement and/or finer MV precisions (e.g., ¼ pel, ⅛ pel, 1/16 pel, or finer). That is to say, in some examples, a video decoder may perform the DMVR process on one or more motion vectors that are sub-integer pel motion vectors. In such cases, the search areas used in the DMVR process may depend on one or more block characteristics as described herein.

The following description is one detailed example decoder process applies decoder-side MV derivation to a coding block. Any of these or other techniques described herein can be applied a decoder of a video coding system or by an encoder, e.g., as part of a decoding loop. A decoder may execute the methods described here by all or a subset of the following steps to decode an inter predicted block in a picture from a bitstream:

Derive a size of the current block as a width value W and a height value H by decoding syntax elements in the bitstream.

Determine that the current block is an inter predicted block from decoding elements in the bitstream.

Derive the motion vector components (mvL0 and mvL1) and reference indices (refPicL0 and refPicL1) of the current block from decoding elements in the bitstream.

Infer a flag from decoding elements in the bitstream, wherein the flag indicates whether the decoder-side motion vector derivation (e.g., DMVR, bilateral merge, template matching) is applied to the current block or not. The inference scheme of the flag can be the same as but not limited the inference techniques described herein. In another example, this flag can be defined by an encoder and explicitly signalled in the bitstream to avoid complex condition check at decoder.

According to the aforementioned flag value, when the decision is to apply DMVR (bilateral merge or template matching) to the current block, in some examples, some or all of the following steps may be performed by the decoder:

Derive number of subblocks in horizontal direction numSbX and in vertical direction numSbY, the subblock width sbW and height sbH as follows:
numSbX=(W>thW)?(W/thW):1
numSbY=(H>thH)?(H/thH):1
sbWidth=(W>thW)?thW:W
sbHeight=(H>thH)?thH:H
wherein, thW and thH are predetermined integer value (e.g. thW=thH=16)

For each subblock from top-left to bottom-right,
Set the myL0 and mvL1 of the current block as the initiate motion vector for the current subblock
Determine a variable sHor and sVer, as follows,
Hor=sbWidth×sFactor
sVer=sbHeight×sFactor
wherein, sFactor is a predetermined variable, (e.g., 0.5)

wherein, sHor specifies the search range [−sHor, sHor] of DMVR in horizontal direction wherein, sVer specifies the search range [−sVer, sVer] of DMVR in vertical direction Derive a prediction signal predSig0 from reference picture 0 by using the derived myL0 and refPicL0. The width of predSig0 is equal to sbW+2×sHor. The height of predSig0 is equal to sbH+2×sVer.

Derive a prediction signal predSig1 from reference picture 1 by using the derived mvL1 and refPicL1. The width of predSig1 is equal to sbW+2×sHor. The height of predSig0 is equal to sbH+2×sVer.

Set a max cost value to a variable minCost

Set a delta MV(0,0) to a variable best delta MV($\Delta$hor_best, $\Delta$ver_best)

Set a value (e.g., 1) to a variable priorityIdx

Loop though each search priority value from, e.g., 1 to, e.g., 5,

Loop through each delta MV($\Delta$hor, $\Delta$ver) from top-left to bottom-right, within the search range of the current subblock, −sVer<=$\Delta$ver<=sVer, −sHor<=$\Delta$hor<=sHor, if sPriority($\Delta$hor, $\Delta$ver) is equal to priorityIdx, Derive the bilateral matching cost bilCost at the current delta MV($\Delta$hor, $\Delta$ver)

Derive bilCost' is equal to bilCost×costFacor ($\Delta$hor, $\Delta$ver)

if bilCost' is less than minCost, set minCost is equal to bilCost' set best delta MV is equal to MV($\Delta$hor, $\Delta$ver)

if minCost is less than costTh, the best delta MV search loop of the current sub-block is terminated priorityIdx=priorityIdx+1

Derive the prediction signal predSig0' from reference picture 0 by using (mvL0+MV($\Delta$hor_best, $\Delta$ver_best)) as the motion vector Derive the prediction signal predSig1' from reference picture 1 by using (mvL1−MV($\Delta$hor_best, $\Delta$ver_best)) as the motion vector Derive the predicted sub-block from predSig0' and predSig1'

Derive the predicted block from each predicted sub-block, using the predicted block for video decoding This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
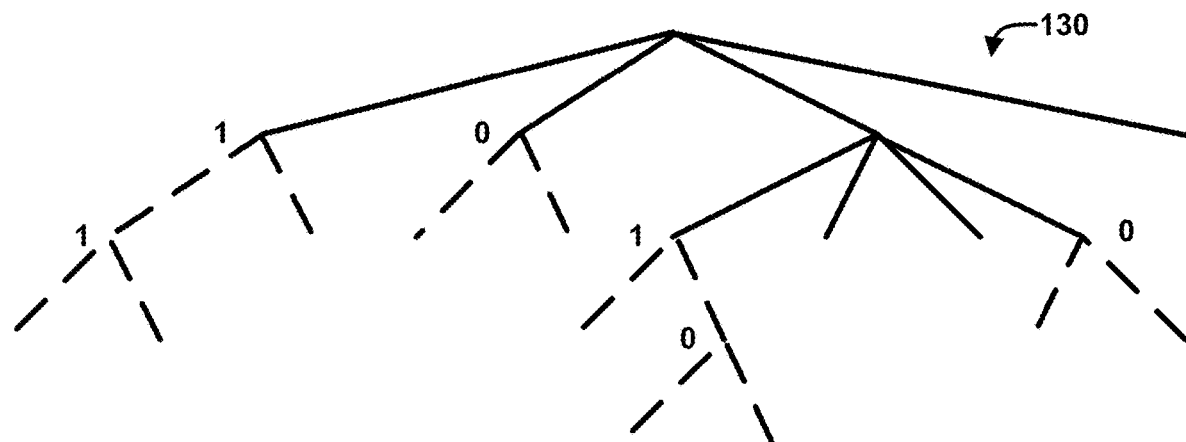
FIGS. 2A and 2B are conceptual diagrams illustrating an example quadtree binary tree (QTBT) structure, and a corresponding coding tree unit (CTU).
Figure 2B:
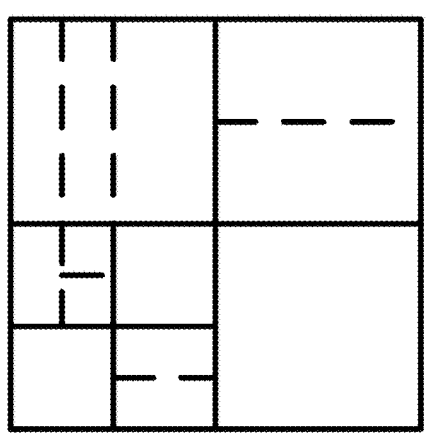

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
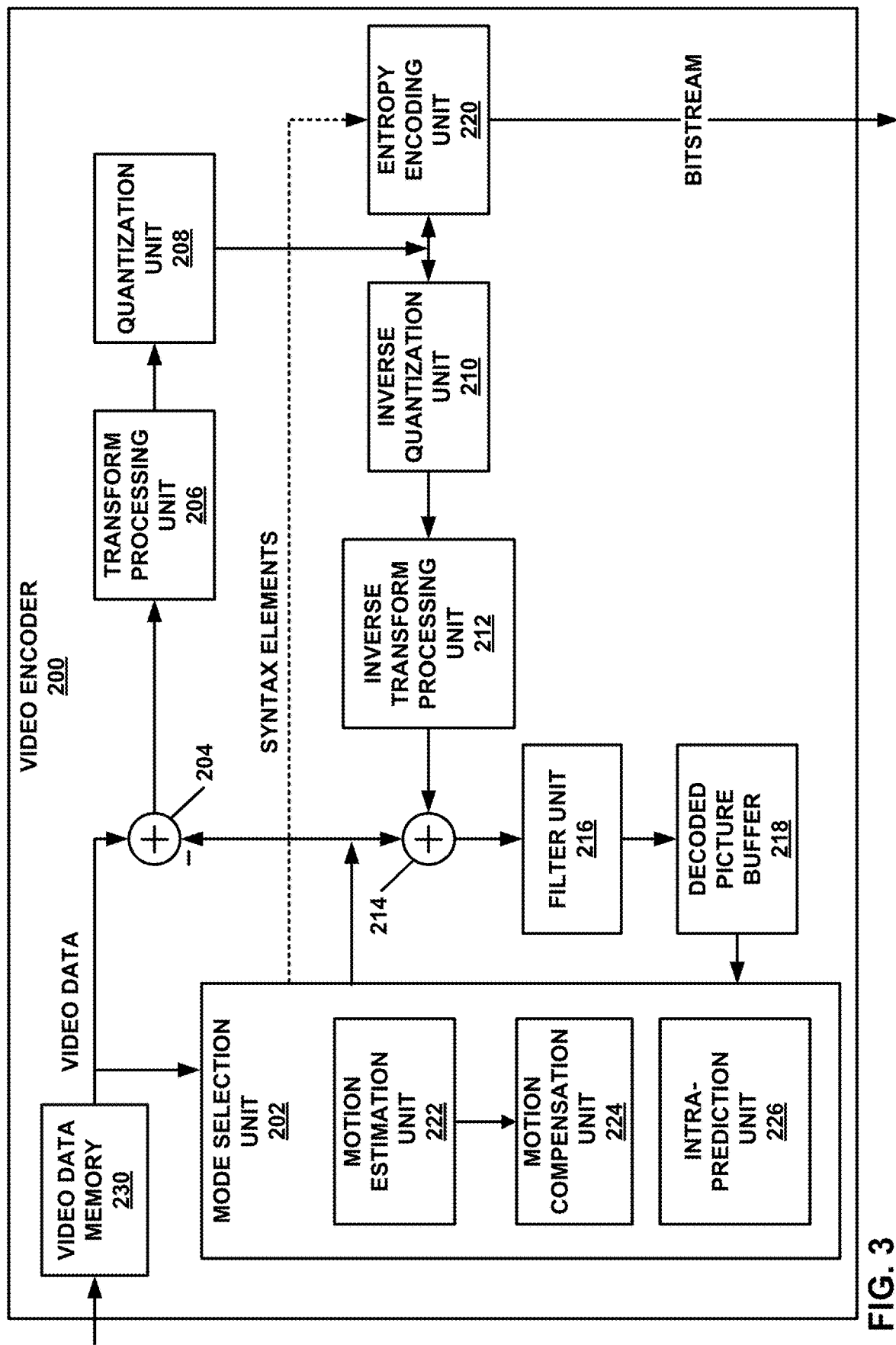
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 may implement a decoding loop in order to generate the decoded video data that will be used by the video decoder, e.g., in predicting other video data. In particular, inverse quantization unit 210, inverse transform processing unit 212, reconstruction unit 214, and filter unit 216 represent components of video encoder 200 configured to decode video data, i.e., the decoding loop. Furthermore, motion compensation unit 224 may perform DMVR when generating a prediction block, both for purposes of encoding and decoding. Therefore, video encoder 200 represents one example of a device configured to decode video data, the device comprising one or more processors configured to: decode data from an encoded bitstream to generate motion vectors, and perform a DMVR process on one or more of the motion vectors. In performing the DMVR process, the one or more processors may be configured to determine one or more characteristics of current video block being decoded, and determine a search area for the DMVR process for the current video block based on the determined one or more characteristics of the current video block.

Figure 4:
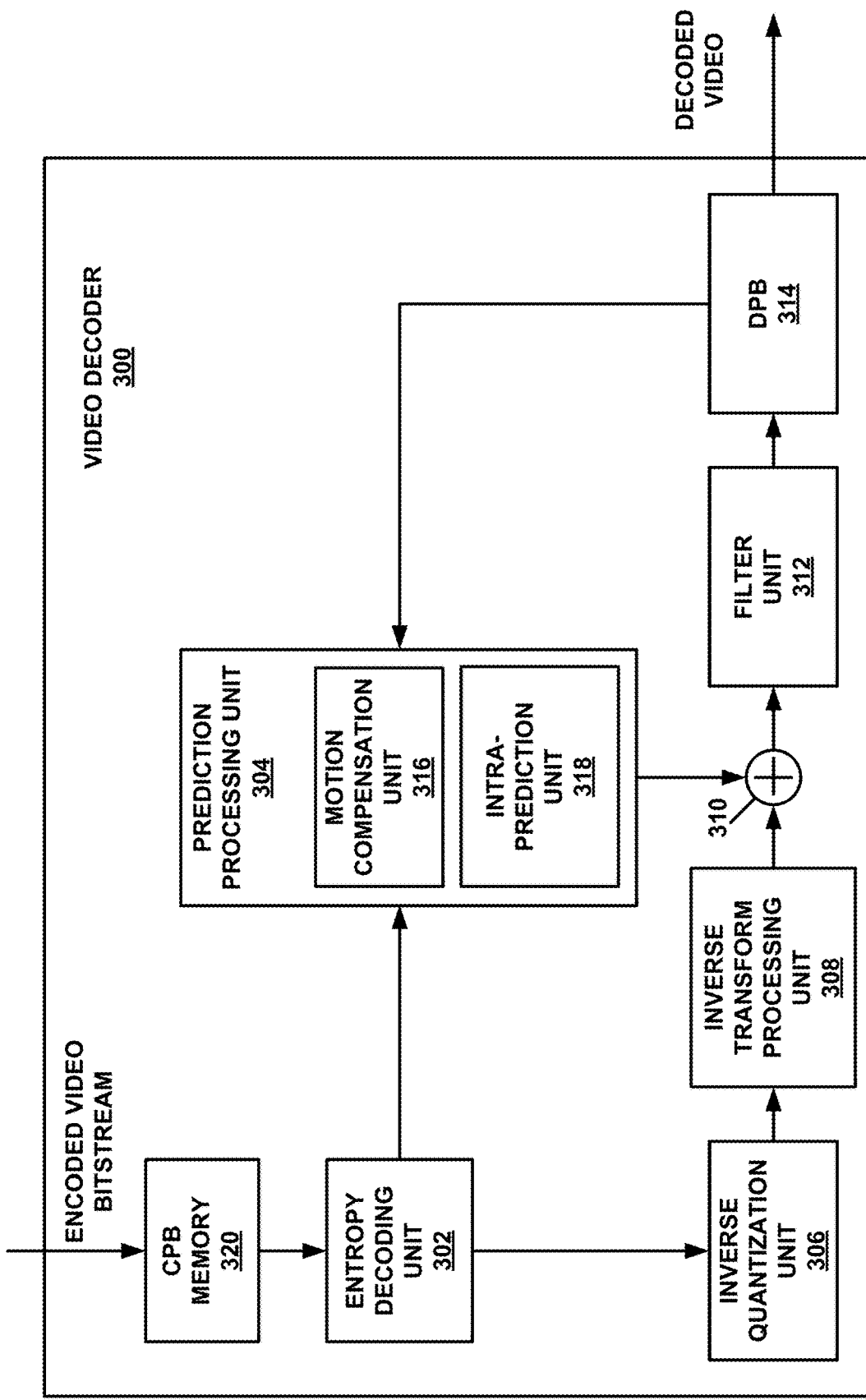
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream.

CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Furthermore, according to this disclosure, motion vectors may be refined by prediction processing unit 304 performing a DMVR process, which may include one or more techniques of this disclosure. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform one or more techniques of this disclosure. For example, video decoder 300 represents one example of a device configured to decode video data, the device comprising one or more processors configured to: decode data from an encoded bitstream to generate motion vectors, and perform a DMVR process on one or more of the motion vectors. In performing the DMVR process, the one or more processors may be configured to determine one or more characteristics of current video block being decoded, and determine a search area for the DMVR process for the current video block based on the determined one or more characteristics of the current video block.

Figure 14:
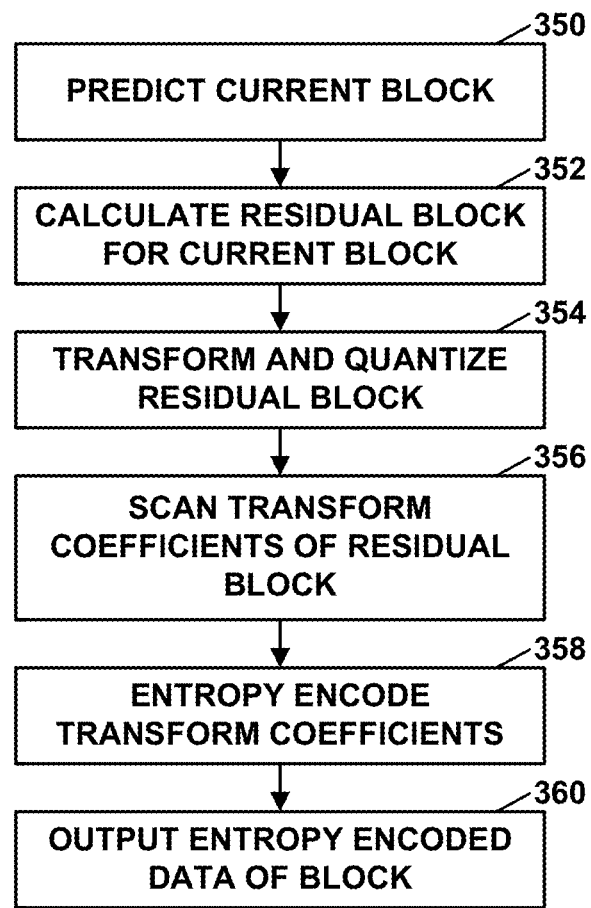
FIG. 14 is a flowchart illustrating an example method for encoding a current block in accordance with the techniques of this disclosure.

FIG. 14 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 14.

In this example, video encoder 200 initially predicts the current block (350). For example, video encoder 200 may form a prediction block for the current block. In accordance with the techniques of this disclosure, video encoder 200 may perform DMVR to refine one or more motion vectors used to form the prediction block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 15:
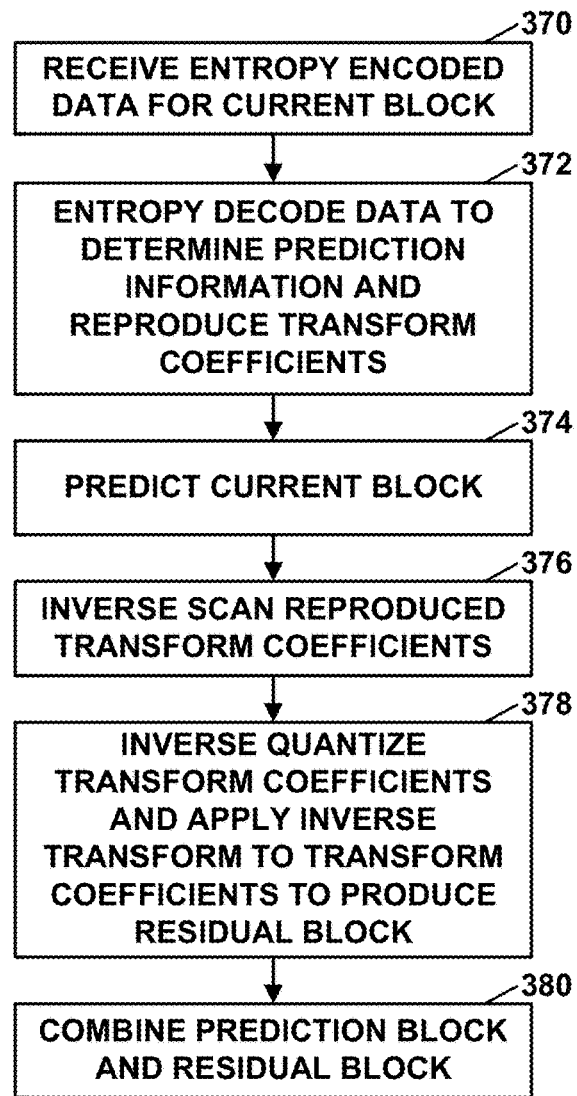
FIG. 15 is a flowchart illustrating an example method for decoding a current block in accordance with the techniques of this disclosure.

FIG. 15 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 15.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. In accordance with the techniques of this disclosure, video decoder 300 may perform DMVR to refine one or more motion vectors used to form the prediction block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378).

Video decoder 300 may ultimately decode the current block by combining the prediction block and the residual block (380).

Figure 16:
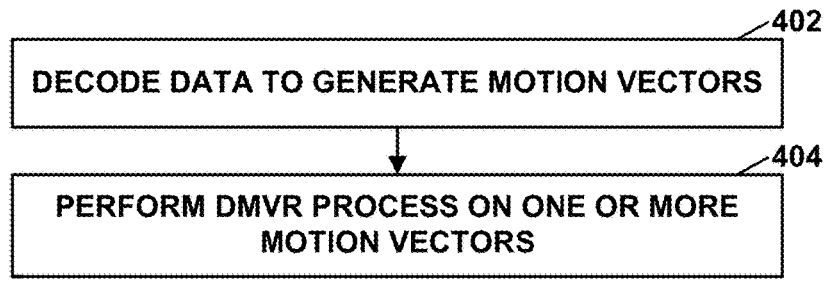
FIG. 16 is a flowchart illustrating an example decoding process

In FIGS. 14 and 15, the step of predicting a current block (e.g., step 350 of FIG. 14 and step 374 in FIG. 15) may use motion vectors in the prediction process. FIG. 16 shows an example decoding process whereby a video device (e.g., a decoder or an encoder that performs a decoding loop) may decode video data to generate one or more motion vectors (402), and perform a DMVR process on the one or more motion vectors (404), such as described herein. Thus, for example, video encoder 200 may perform the method of FIG. 16 when predicting a current block per step 350 of FIG. 14, and video decoder 300 may perform the method of FIG. 16 when predicting a current block per step 374 of FIG. 15.

Figure 17:
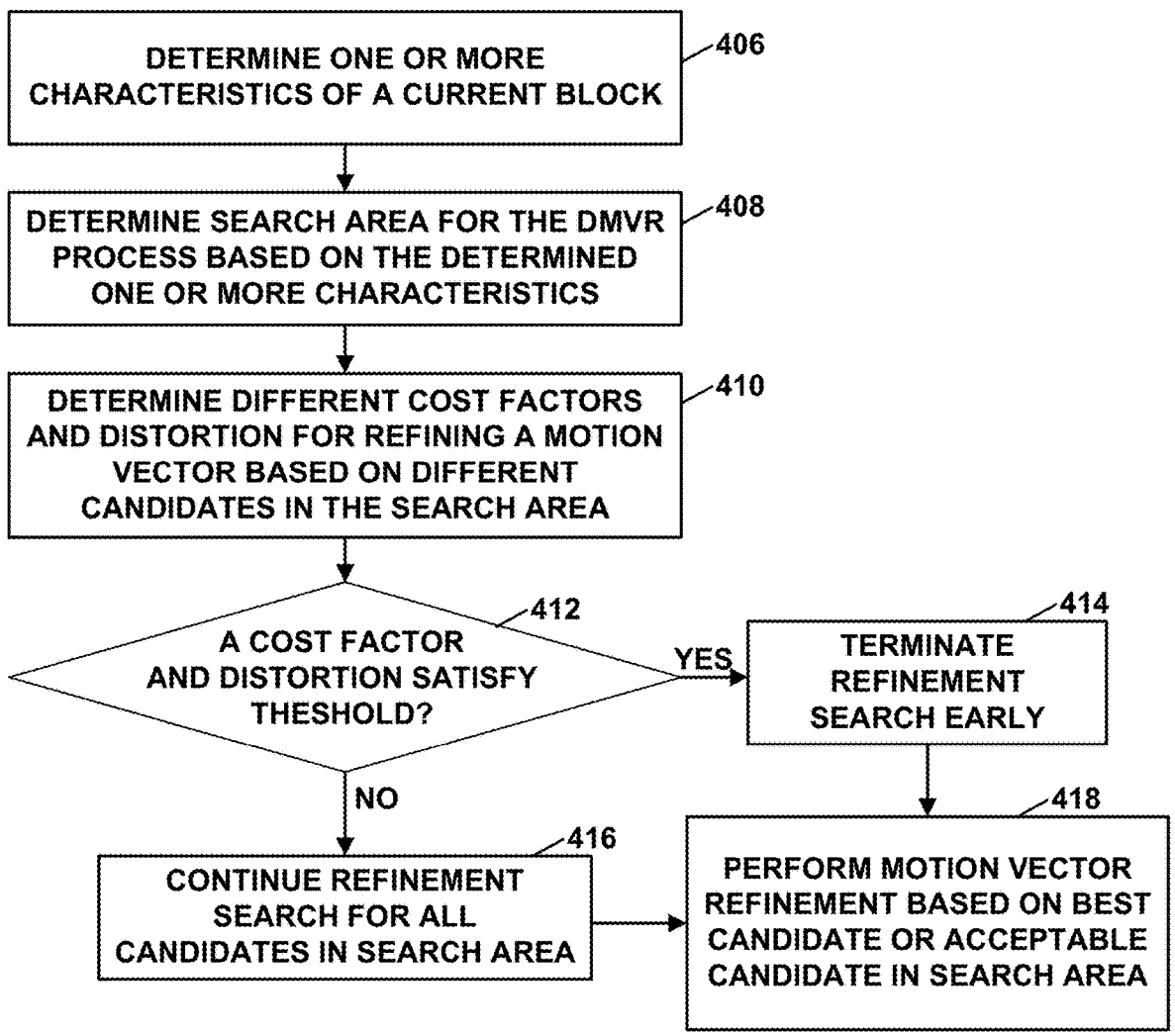
FIG. 17 is a flow diagram that shows an example process that may be performed in the DMVR process to refine one or more motion vectors.

FIG. 17 is a flow diagram that shows an example process that may be performed in the DMVR process to refine one or more motion vectors. As shown, a video decoder (e.g., decoder 300 or encoder 200 performing a decoding loop) may determine one or more characteristics of current video block being decoded (406), and determine a search area for the DMVR process for the current video block based on the determined one or more characteristics of the current video block (408). The video decoder may use the determined search area for the DMVR process, and the determined search area may include on the data (e.g., samples) in the determined area and to exclude data (e.g., samples) outside of the determined search area, which can eliminate unnecessary use of memory for samples outside of the determined search area. For example, the video decoder may determine the search area for the DMVR process for the current video block based on one or more dimensions of the current video block. In some examples, the video decoder may determine the search area for the DMVR process for the current video block based on a height and a width of the current video block. In some examples, the video decoder may determine the search area for the DMVR process based on the height and the width of the current block and based on a scale factor, such as based on the "sFactor" described above or another type of metric that can be used for scaling. If a scale factor is used, in some examples, the scale factor may be stored in the decoder and not signaled in the encoded bitstream, whereas in other examples, the scale factor may be derived or determined by the decoder based on one or more syntax elements decoded from the encoded bitstream.

In any case, the video decoder may then determine different cost factors and distortion associated with candidate blocks in the search area for the DMVR process (410). The cost factors prioritize one or more candidate blocks in the search area that are closer to the center of the search area relative to other candidate in the search area that are farther from the center of the search area. FIGS. 12 and 13 are conceptual diagrams showing two different example searching patterns (and some example cost factors) that may be used when searching for a refinement motion vector within a search area.

In some examples, the video decoder may apply a threshold to the DMVR process so that the process can be terminated if an acceptable refinement is discovered. This can reduce the amount of computations needed for the DMVR process. For example, a video decoder may determine whether a cost factor and distortion satisfy a threshold (412). The threshold, for example, may define an acceptable level of video quality (distortion) multiple by a cost factor (e.g., a scaling factor defined based on the location of the refinement motion vector relative to a location of the block being coded. If the cost factor and distortion satisfy the threshold (yes branch of 412), then the decoder terminate the refinement search early (414). In other words, the decoder may terminate the DMVR process for the current video block prior to considering all candidate blocks in the search area, upon identifying an acceptable candidate associated with a cost factor and distortion that satisfy a threshold. However, if the cost factor and distortion do not satisfy the threshold (no branch of 412), then the decoder may continue the refinement search for all candidates in the search space (416). The video decoder may then perform motion vector refinement based on the best candidate in the search space (in terms of distortion and cost factor) or based on the acceptable candidate (418), if one is identified that satisfies the threshold. In some examples, video decoder 300 limits a refinement search to the defined search area that is defined for the DMVR process, such that video decoder 300 uses only samples of the search area to refine the motion vector. Thus, video decoder 300 may avoid using data (e.g., samples) outside of the determined search area when refining the motion vector in the DMVR process.

The process of FIG. 17 may be repeated in refining different motion vectors. Thus, the described search area may be referred to as a first search area used in refining a motion vector of a first video block. The video decoder may determine one or more characteristics of second video block being decoded and determine a second search area for the DMVR process for the second video block based on the determined one or more characteristics of the second video block. Since the first video block may have different characteristics than the second video block, in some examples, the second search area may define at least on different dimension than the first search area.

In still other examples, a decoder may determine the search area for the DMVR process based a resolution associated with a video sequence that includes the current video block being decoded. In some cases, the search area for the DMVR process may be based solely on resolution, and in other cases, the search area for the DMVR process may be based on characteristics of the block being coded and based on resolution. For example, resolution could define an upper bound or a search space size range or one or more dimensions of the search space, and block characteristics may be used to define a given search space within the range or bounds defined by the resolution. In still other examples, the resolution may be used to define boundaries (largest and smallest sized search area) and block adaptive decisions on the search area size could be made within the defined boundaries.

In still other examples, a video decoder may receive one or more syntax elements associated with the search area for the DMVR process, decode the one or more syntax elements to define one or more values, determine a one or more dimensions of the search area based on the one or more values, and generate the search area based on the one or more dimensions of the search area. In some cases, the search area may be defined based solely on the one or more values decoded from the syntax elements, and in other in other cases, the search area for the DMVR process may be based on characteristics of the block being coded in combination with the one or more values decoded from the syntax elements. For example, the one or more values decoded from the syntax elements may be used to define boundaries (largest and smallest sized search area or largest and smallest dimensions of a search space) and block adaptive decisions on the search area size or dimensions could be made within the defined boundaries.

The following clauses may define one or more aspects of this disclosure.

Clause 1—A method of decoding video data, the method comprising: decoding data from an encoded bitstream to generate motion vectors; and performing a decoder-side motion vector refinement (DMVR) process on one or more of the motion vectors, wherein performing the DMVR process includes: determining one or more characteristics of current video block being decoded; and determining a search area for the DMVR process for the current video block based on the determined one or more characteristics of the current video block.

Clause 2—The method of clause 1, further comprising determining the search area for the DMVR process for the current video block based on at least one dimension of the current video block.

Clause 3—The method of clause 2, further comprising determining the search area for the DMVR process for the current video block based on a height and a width of the current video block.

Clause 4—The method of clause 3, further comprising determining the search area for the DMVR process based on the height and the width of the current block and based on a scale factor.

Clause 5—The method of clause 4, wherein the scale factor is stored in the decoder and not signaled in the encoded bitstream.

Clause 6—The method of clause 4, further comprising deriving the scale factor based on one or more syntax elements decoded from the encoded bitstream.

Clause 7—The method of any of clauses 1-6, wherein the current video block is a first video block and the search area is a first search area, the method further comprising: determining one or more characteristics of second video block being decoded; and determining a second search area for the DMVR process for the second video block based on the determined one or more characteristics of the second video block, wherein the second search area has at least one different dimension than the first search area.

Clause 8—The method of any of clauses 1-6, further comprising determining the search area for the DMVR process based a resolution associated with a video sequence that includes the current video block.

Clause 9—The method of any of clauses 1-8, wherein the DMVR process includes: determining cost factors and distortion associated with candidate blocks in the search area for the DMVR process, wherein the cost factors prioritize one or more candidate blocks in the search area that are closer to the center of the search area relative to other candidates in the search area that are farther from the center of the search area.

Clause 10—The method of any of clauses 1-9, wherein the DVMR process includes: terminating the DMVR process for the current video block prior to considering all candidate blocks in the search area, upon identifying an acceptable candidate associated with a cost factor and distortion that satisfy a threshold.

Clause 11—The method of any of clauses 1-10, further comprising: receiving one or more syntax elements associated with the search area for the DMVR process; decoding the one or more syntax elements to define one or more values; determining one or more dimensions of the search area based on the one or more values; and generating the search area based on the one or more dimensions of the search area.

Clause 12—A device configured to decode video data, the device comprising one or more processors configured to:

decode data from an encoded bitstream to generate motion vectors; and perform a decoder-side motion vector refinement (DMVR) process on one or more of the motion vectors, wherein in performing the DMVR process, the one or more processors are configured to: determine one or more characteristics of current video block being decoded; and determine a search area for the DMVR process for the current video block based on the determined one or more characteristics of the current video block.

Clause 13—The device of clause 12, wherein the one or more processors are further configured to determine the search area for the DMVR process for the current video block based on at least one dimension of the current video block.

Clause 14—The device of clause 13, wherein the one or more processors are further configured to determine the search area for the DMVR process for the current video block based on a height and a width of the current video block.

Clause 15—The device of clause 14, wherein the one or more processors are further configured to determine the search area for the DMVR process based on the height and the width of the current block and based on a scale factor.

Clause 16—The device of clause 15, further comprising a memory, wherein the scale factor is stored in the memory and not signaled in the encoded bitstream.

Clause 17—The device of clause 15, wherein the one or more processors are configured to derive the scale factor based on one or more syntax elements decoded from the encoded bitstream.

Clause 18—The device of any of clauses 12-17, wherein the current video block is a first video block and the search area is a first search area, wherein the one or more processors are further configured to: determine one or more characteristics of second video block being decoded; and determine a second search area for the DMVR process for the second video block based on the determined one or more characteristics of the second video block, wherein the second search area has at least one different dimension than the first search area.

Clause 19—The device of any of clauses 12-17, wherein the one or more processors are further configured to: determine the search area for the DMVR process based a resolution associated with a video sequence that includes the current video block.

Clause 20—The device of any of clauses 12-19, wherein to perform the DMVR process, the one or more processors are configured to: determine cost factors and distortion associated with candidate blocks in the search area for the DMVR process, wherein the cost factors prioritize one or more candidate blocks in the search area that are closer to the center of the search area relative to other candidate in the search area that are farther from the center of the search area.

Clause 21—The device of any of clauses 12-20, wherein to perform the DMVR process, the one or more processors are configured to: terminate the DMVR process for the current video block prior to considering all candidate blocks in the search area, upon identifying an acceptable candidate associated with a cost factor and distortion that satisfy a threshold.

Clause 22—The device of any of clauses 12-21, one or more processors configured to: receive one or more syntax elements associated with the search area for the DMVR process; decode the one or more syntax elements to define one or more values; determine one or more dimensions of the search area based on the one or more values; and generate the search area based on the one or more dimensions of the search area.

Clause 23—The device of any of clauses 12-22, wherein the device includes a display configured to display the video data.

Clause 24—The device of any of clauses 12-23, further comprising memory configured to store the video data.

Clause 25—A device for decoding video data, the device comprising: means for decoding data from an encoded bitstream to generate motion vectors; and means for performing a decoder-side motion vector refinement (DMVR) process on one or more of the motion vectors, wherein means for performing the DMVR process includes: means for determining one or more characteristics of current video block being decoded; and means for determining a search area for the DMVR process for the current video block based on the determined one or more characteristics of the current video block.

Clause 26—A computer-readable storage medium storing instructions that, when executed, cause one or more processors of a video decoding device to: decode data from an encoded bitstream to generate motion vectors; and perform a decoder-side motion vector refinement (DMVR) process on one or more of the motion vectors, wherein in performing the DMVR process, the instructions cause the one or more processors to: determine one or more characteristics of current video block being decoded; and determine a search area for the DMVR process for the current video block based on the determined one or more characteristics of the current video block.

Clause 27—A device comprising means for performing the method of any of clauses 1-11.

Clause 28—A computer-readable storage medium storing instructions that, when executed, cause one or more processors of a video decoding device to perform the method of any of clauses 1-11.

Clause 29—Any method described in this disclosure.

Clause 30—A device configured to perform any method described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding data from an encoded bitstream to generate motion vectors; and
    performing a decoder-side motion vector refinement (DMVR) process on one or more of the motion vectors, wherein performing the DMVR process includes:
        determining, among a height or a width, at least one dimension of a current video block being decoded to be a determined at least one dimension;
        determining a size of a search range for the DMVR process for the current video block based on the determined at least one dimension of the current video block, wherein the size of the search range defines a local search area;
        determining one or more motion vector offsets within the local search area; and
        determining a refined motion vector from the one or more motion vector offsets.

2. The method of claim 1, further comprising determining the size of the search range for the DMVR process for the current video block based on a height and a width of the current video block.

3. The method of claim 2, further comprising determining the size of the search range for the DMVR process based on the height and the width of the current block and based on a scale factor.

4. The method of claim 3, wherein the scale factor is stored in the decoder and not signaled in the encoded bitstream.

5. The method of claim 3, further comprising deriving the scale factor based on one or more syntax elements decoded from the encoded bitstream.

6. The method of claim 1, wherein the current video block is a first video block of the encoded bitstream, the determined at least one dimension is a first determined at least one dimension, and the size of the search range is a first search range size, the method further comprising:
    determining, among a height or a width, at least one dimension of a second video block of the encoded bitstream being decoded to be a second determined at least one dimension; and
    determining a second search range size for a DMVR process for the second video block based on the second determined at least one dimension of the second video block,
    wherein the second search range size has at least one different dimension than the first search range size.

7. The method of claim 1, further comprising further determining the size of the search range for the DMVR process based on a resolution associated with a video sequence that includes the current video block.

8. The method of claim 1, wherein the DMVR process includes:
    determining respective cost factors and respective priority variables for each of the one or more motion vector offsets based on a distance of the one or more motion vector offsets to a center of the local search area; and
    determining, according to a search order based on the respective priority variables, the refined motion vector from the one or more motion vector offsets using the respective cost factors.

9. The method of claim 1, wherein the DVMR process includes:
    terminating the DMVR process for the current video block prior to evaluating all candidate blocks having a respective motion vector offset in the local search area upon identifying an acceptable candidate block associated with a cost factor and distortion that satisfy a threshold.

10. A device configured to decode video data, the device comprising one or more processors configured to:
    decode data from an encoded bitstream to generate motion vectors; and
    perform a decoder-side motion vector refinement (DMVR) process on one or more of the motion vectors, wherein in performing the DMVR process, the one or more processors are configured to:

determine, among a height or a width, at least one dimension of a current video block being decoded to be a determined at least one dimension;

determine a size of a search range for the DMVR process for the current video block based on the determined at least one dimension of the current video block, wherein the size of the search range defines a local search area;

determine one or more motion vector offsets within the local search area; and determine a refined motion vector from the one or more motion vector offsets.

11. The device of claim 10, wherein the one or more processors are further configured to determine the size of the search range for the DMVR process for the current video block based on a height and a width of the current video block.

12. The device of claim 11, wherein the one or more processors are further configured to determine the size of the search range for the DMVR process based on the height and the width of the current block and based on a scale factor.

13. The device of claim 12, further comprising a memory, wherein the scale factor is stored in the memory and not signaled in the encoded bitstream.

14. The device of claim 12, wherein the one or more processors are configured to derive the scale factor based on one or more syntax elements decoded from the encoded bitstream.

15. The device of claim 10, wherein the current video block is a first video block of the encoded bitstream, the determined at least one dimension is a first determined at least one dimension, and the size of the search range is a first search range size, wherein the one or more processors are further configured to:

determine, among a height and a width, at least one dimension of a second video block of the encoded bitstream being decoded to be a second determined at least one dimension; and determine a second search range size for a DMVR process for the second video block based on the second determined at least one dimension of the second video block, wherein the second search range size has at least one different dimension than the first search range size.

16. The device of claim 10, wherein the one or more processors are further configured to:

determine the size of the search range for the DMVR process based on a resolution associated with a video sequence that includes the current video block.

17. The device of claim 10, wherein to perform the DMVR process, the one or more processors are configured to:

determine respective cost factors and respective priority variables for each of the one or more motion vector offsets based on a distance of the one or more motion vector offsets to a center of the local search area; and determine, according to a search order based on the respective priority variables, the refined motion vector from the one or more motion vector offsets using the respective cost factors.

18. The device of claim 10, wherein to perform the DMVR process, the one or more processors are configured to:

terminate the DMVR process for the current video block prior to evaluating all candidate blocks having a respective motion vector offset in the local search area, upon identifying an acceptable candidate block associated with a cost factor and distortion that satisfy a threshold.

19. The device of claim 10, wherein the device includes a display configured to display the video data.

20. The device of claim 10, further comprising memory configured to store the video data.

21. A device for decoding video data, the device comprising:

means for decoding data from an encoded bitstream to generate motion vectors; and means for performing a decoder-side motion vector refinement (DMVR) process on one or more of the motion vectors, wherein means for performing the DMVR process includes:

means for determining, among a height or a width, at least one dimension of a current video block being decoded to be a determined at least one dimension;

means for determining a size of a search range for the DMVR process for the current video block based on the determined at least one dimension of the current video block, wherein the size of the search range defines a local search area;

means for determining one or more motion vector offsets within the local search area; and means for determining a refined motion vector from the one or more motion vector offsets.

22. A computer-readable storage medium storing instructions that, when executed, cause one or more processors of a video decoding device to:

decode data from an encoded bitstream to generate motion vectors; and perform a decoder-side motion vector refinement (DMVR) process on one or more of the motion vectors, wherein in performing the DMVR process, the instructions cause the one or more processors to:

determine, among a height or a width, at least one dimension of a current video block being decoded to be a determined at least one dimension;

determine a size of a search range for the DMVR process for the current video block based on the determined at least one dimension of the current video block, wherein the size of the search range defines a local search area;

determine one or more motion vector offsets within the local search area; and determine a refined motion vector from the one or more motion vector offsets.

23. The method of claim 8, wherein determining, according to the search order based on the respective priority variables, the refined motion vector from the one or more motion vector offsets using the respective cost factors comprises:

performing a cost tuning process starting with a motion vector offset associated with a respective priority variable having a highest priority, the cost tuning process comprising:

calculating a matching cost for the motion vector offset;

applying cost tuning to the matching cost using the respective cost factor associated with the motion vector offset to generate a tuned matching cost;

updating a best motion vector offset based on the tuned matching cost being smaller than a best cost; and terminating the process and using the best motion vector offset to determine the refined motion vector based on the tuned matching cost being smaller than a cost threshold, or repeating the cost tuning process for a next motion vector offset associated with a respective priority variable having a next highest priority.

24. The device of claim 17, wherein to determine, according to the search order based on the respective priority variables, the refined motion vector from the one or more motion vector offsets using the respective cost factors, the one or more processors are configured to:
- perform a cost tuning process starting with a motion vector offset associated with a respective priority variable having a highest priority, wherein to perform the cost tuning process the one or more processors are configured to:
  - calculate a matching cost for the motion vector offset;
  - apply cost tuning to the matching cost using the respective cost factor associated with the motion vector offset to generate a tuned matching cost;
  - update a best motion vector offset based on the tuned matching cost being smaller than a best cost; and
  - terminate the process and using the best motion vector offset to determine the refined motion vector based on the tuned matching cost being smaller than a cost threshold, or
- repeat the cost tuning process for a next motion vector offset associated with a respective priority variable having a next highest priority.

* * * * *